United States Patent
Tanaka

(10) Patent No.: US 12,526,553 B2
(45) Date of Patent: Jan. 13, 2026

(54) SOLID-STATE IMAGING ELEMENT, METHOD OF MANUFACTURING SOLID-STATE IMAGING ELEMENT, AND ELECTRONIC DEVICE

(71) Applicant: SONY SEMICONDUCTOR SOLUTIONS CORPORATION, Kanagawa (JP)

(72) Inventor: Harumi Tanaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 836 days.

(21) Appl. No.: 17/295,129

(22) PCT Filed: Nov. 15, 2019

(86) PCT No.: PCT/JP2019/044911
§ 371 (c)(1),
(2) Date: May 19, 2021

(87) PCT Pub. No.: WO2020/116131
PCT Pub. Date: Jun. 11, 2020

(65) Prior Publication Data
US 2022/0006969 A1   Jan. 6, 2022

(30) Foreign Application Priority Data

Dec. 3, 2018 (JP) .................. 2018-226788

(51) Int. Cl.
*H04N 25/79* (2023.01)
*H10F 39/00* (2025.01)
*H10F 39/18* (2025.01)

(52) U.S. Cl.
CPC ............. *H04N 25/79* (2023.01); *H10F 39/18* (2025.01); *H10F 39/8037* (2025.01);
(Continued)

(58) Field of Classification Search
CPC ........... H01L 27/14612; H01L 27/4623; H01L 27/4643; H01L 27/4621; H01L 27/463;
(Continued)

(56) References Cited

U.S. PATENT DOCUMENTS 9,806,118 B2    10/2017  Miyanami
2008/0297634 A1* 12/2008  Uya .................. H10F 39/026
                                                        348/294

(Continued)

FOREIGN PATENT DOCUMENTS

CN    102376726 A    3/2012
CN    107924929 A    4/2018
(Continued)

OTHER PUBLICATIONS

International Search Report and Written Opinion prepared by the European Patent Office on Feb. 5, 2020, for International Application No. PCT/JP2019/044911.

*Primary Examiner* — Chad M Dicke
*Assistant Examiner* — Mario Andres Autore, Jr.
(74) *Attorney, Agent, or Firm* — SHERIDAN ROSS P.C.

(57) ABSTRACT

An imaging device includes a photoelectric conversion region disposed in a substrate having a first conductivity type. The imaging device includes a first region having a second conductivity type and disposed in the substrate at a first side of the photoelectric conversion region in a cross sectional view, where the first side of the photoelectric conversion region is opposite to a light-incident side of the photoelectric conversion region. The imaging device also includes a second region having the second conductivity type at a higher impurity concentration than the first region and the second region is disposed in the substrate around three sides of the photoelectric conversion region other than the first side of the photoelectric conversion region in the cross-sectional view. The imaging device also includes a
(Continued)

light shielding structure that penetrates through the substrate and that is adjacent to sidewalls of the second region.

12 Claims, 11 Drawing Sheets

(52) U.S. Cl.
CPC ..... *H10F 39/8057* (2025.01); *H10F 39/8053* (2025.01); *H10F 39/807* (2025.01)

(58) Field of Classification Search
CPC . H01L 27/461; H01L 27/464; H01L 27/4689; H04N 25/75; H04N 25/79
See application file for complete search history.

(56) References Cited

U.S. PATENT DOCUMENTS

| | | | | |
|---|---|---|---|---|
| 2010/0201834 | A1* | 8/2010 | Maruyama | H10F 39/8067 257/E31.127 |
| 2010/0276572 | A1* | 11/2010 | Iwabuchi | H10F 39/811 257/443 |
| 2011/0019050 | A1* | 1/2011 | Yamashita | H10F 39/199 348/308 |
| 2012/0033119 | A1* | 2/2012 | Shinohara | H10F 39/024 257/E31.119 |
| 2014/0054662 | A1 | 2/2014 | Yanagita et al. | |
| 2014/0084143 | A1* | 3/2014 | Sakano | H10F 39/803 257/292 |
| 2014/0131779 | A1 | 5/2014 | Takeda | |
| 2014/0232918 | A1 | 8/2014 | Shinohara | |
| 2015/0228693 | A1* | 8/2015 | Toda | H04N 25/77 257/229 |
| 2016/0020237 | A1* | 1/2016 | Yamakawa | H10F 39/802 257/233 |
| 2016/0118422 | A1 | 4/2016 | Takeda | |
| 2016/0190200 | A1 | 6/2016 | Shinohara | |
| 2016/0204150 | A1 | 7/2016 | Oh | |
| 2016/0211288 | A1 | 7/2016 | Yanagita et al. | |
| 2016/0268322 | A1 | 9/2016 | Watanabe et al. | |
| 2016/0336372 | A1 | 11/2016 | Yanagita et al. | |
| 2016/0343751 | A1* | 11/2016 | Sze | H10F 39/8053 |
| 2017/0098671 | A1 | 4/2017 | Shinohara | |
| 2017/0148838 | A1 | 5/2017 | Togashi | |
| 2017/0170217 | A1 | 6/2017 | Yanagita et al. | |
| 2017/0271385 | A1 | 9/2017 | Yanagita et al. | |
| 2017/0317119 | A1 | 11/2017 | Shinohara | |
| 2018/0026062 | A1 | 1/2018 | Takeda | |
| 2018/0033809 | A1* | 2/2018 | Tayanaka | H04N 25/60 |
| 2018/0090526 | A1 | 3/2018 | Mandai | |
| 2018/0114806 | A1 | 4/2018 | Kim | |
| 2018/0294296 | A1 | 10/2018 | Shinohara | |
| 2018/0294304 | A1 | 10/2018 | Janssens | |
| 2018/0366500 | A1 | 12/2018 | Takeda | |
| 2019/0027520 | A1 | 1/2019 | Yanagita et al. | |
| 2019/0035827 | A1* | 1/2019 | Kawabata | H10F 39/182 |
| 2019/0131328 | A1* | 5/2019 | Kim | H10F 39/18 |
| 2019/0157325 | A1 | 5/2019 | Shinohara | |
| 2019/0206911 | A1 | 7/2019 | Yanagita et al. | |
| 2019/0371846 | A1* | 12/2019 | Arakawa | H04N 25/616 |
| 2020/0035724 | A1* | 1/2020 | Machida | H10F 39/8057 |

FOREIGN PATENT DOCUMENTS

| | | |
|---|---|---|
| JP | 2012038981 A | 2/2012 |
| JP | 2015-162603 | 9/2015 |
| JP | 2015228510 A | 12/2015 |
| TW | 201208053 A | 2/2012 |
| TW | 201719876 A | 6/2017 |
| WO | WO 2015/059898 | 4/2015 |
| WO | WO-2017159361 A1 | 9/2017 |
| WO | WO-2018083990 A1 | 5/2018 |
| WO | WO-2018100998 A1 | 6/2018 |

* cited by examiner

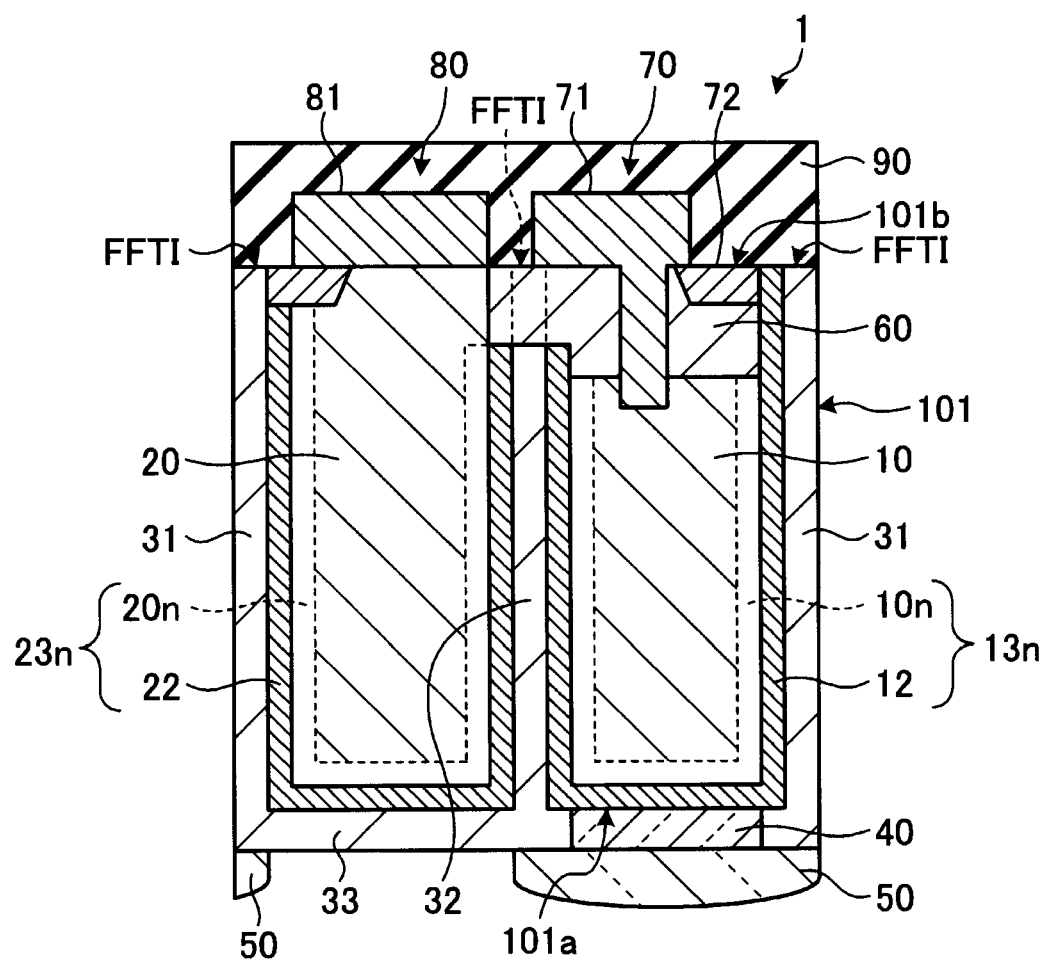

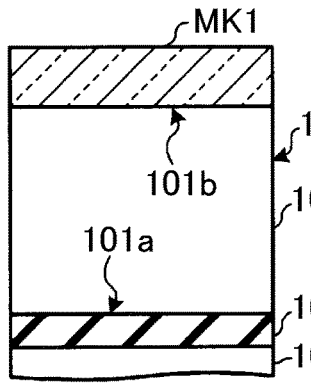
FIG. 2A1
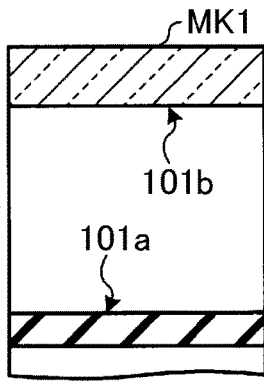
FIG. 2B1
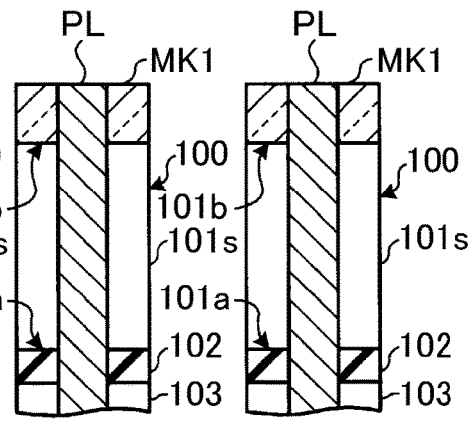
FIG. 2C1  FIG. 2D1
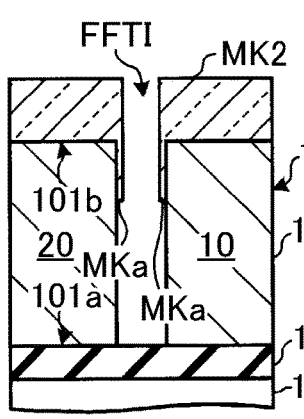
FIG. 2A2
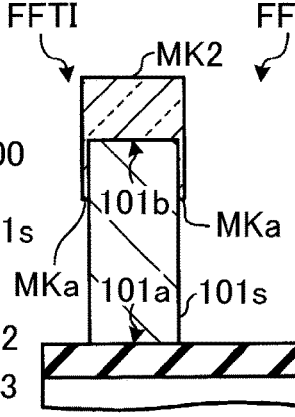
FIG. 2B2
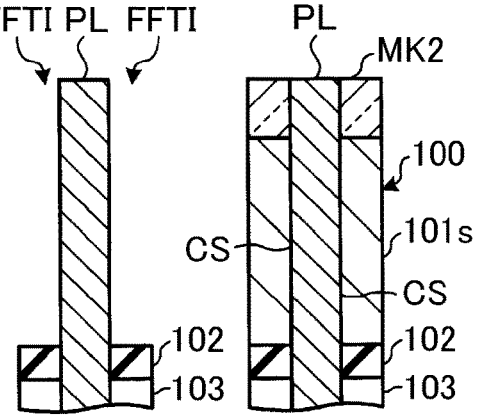
FIG. 2C2  FIG. 2D2
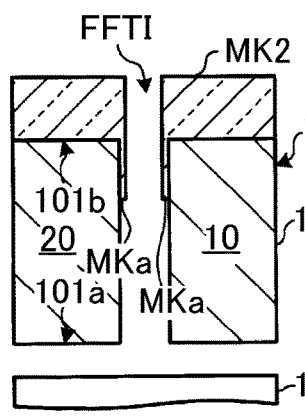
FIG. 2A3
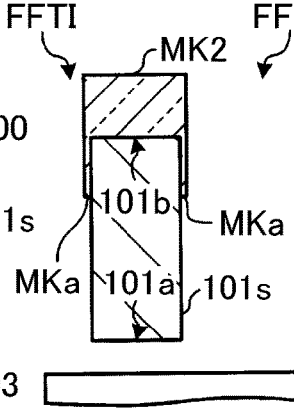
FIG. 2B3
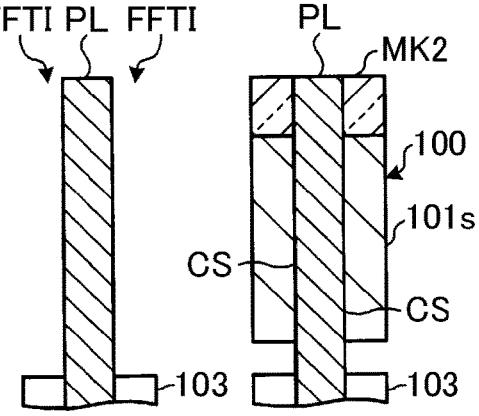
FIG. 2C3  FIG. 2D3

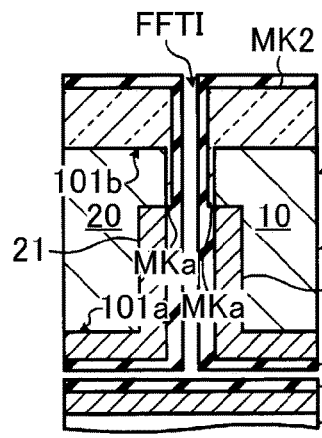 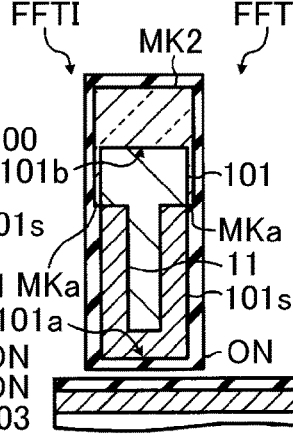 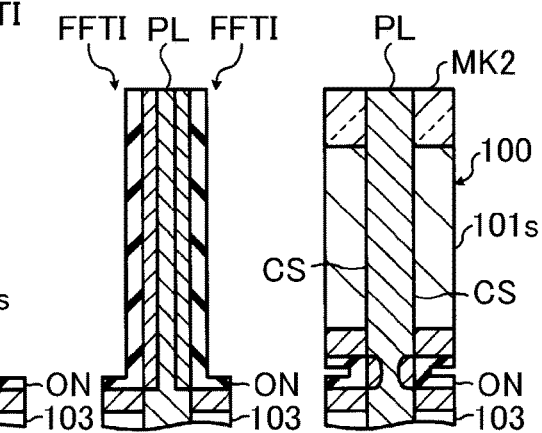
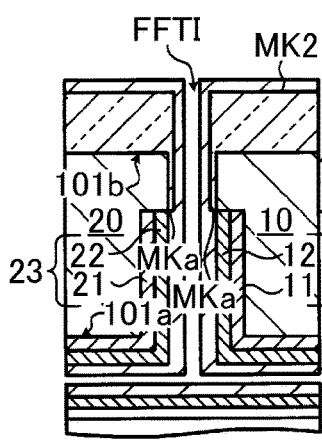 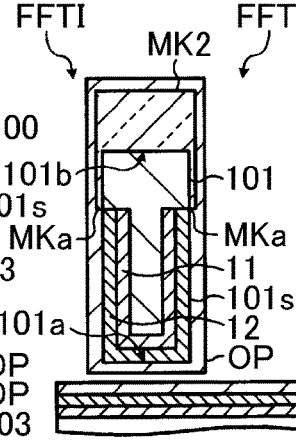 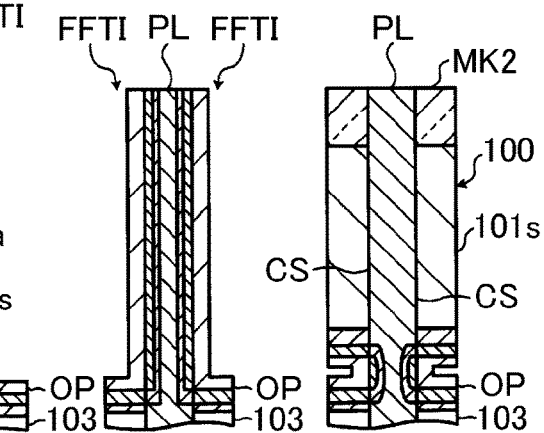
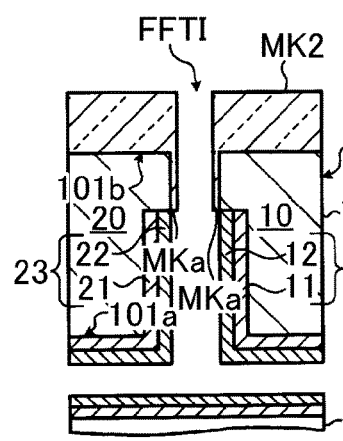 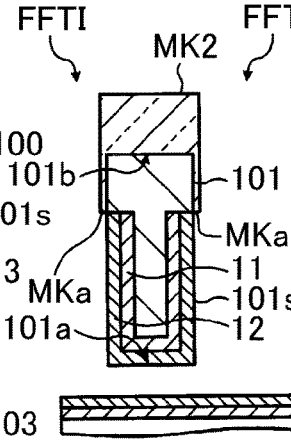 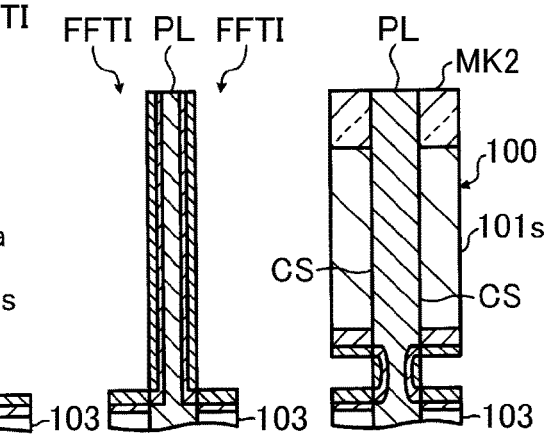

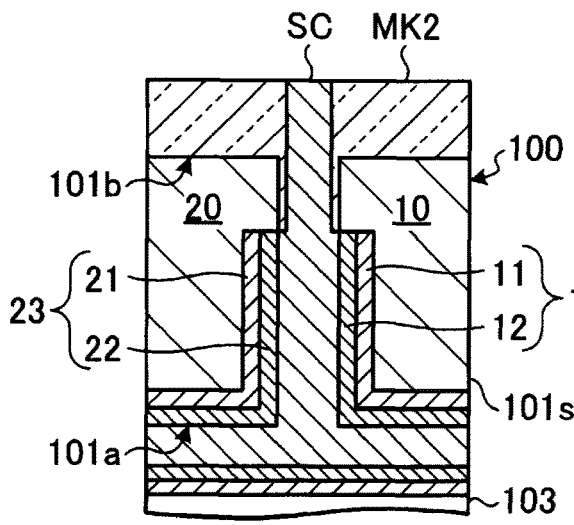
FIG. 4A1
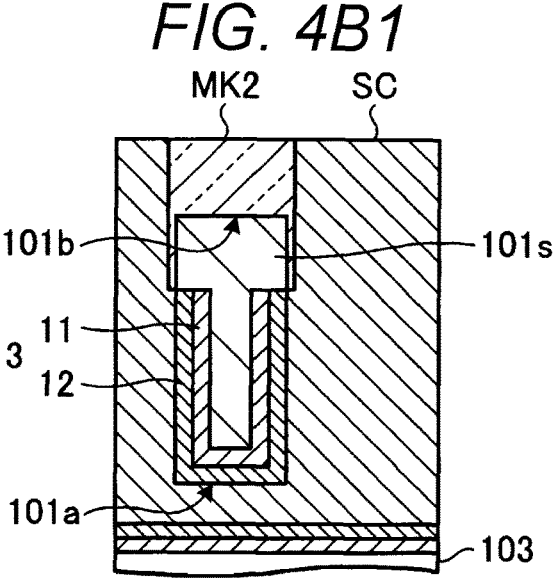
FIG. 4B1
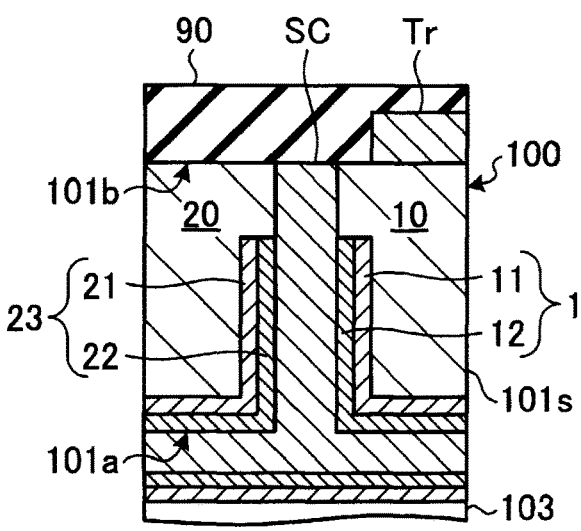
FIG. 4A2
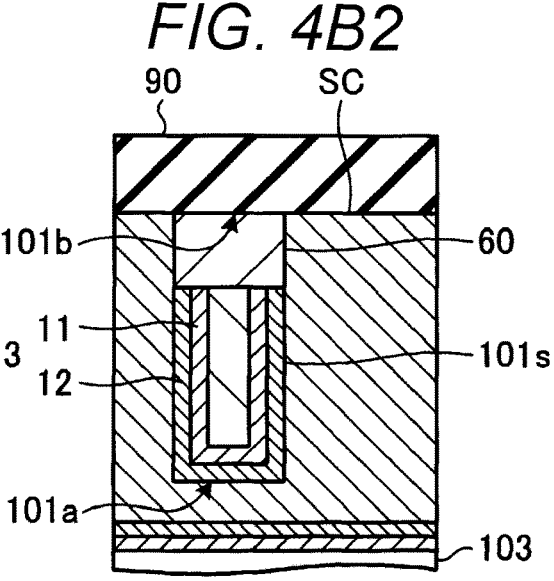
FIG. 4B2
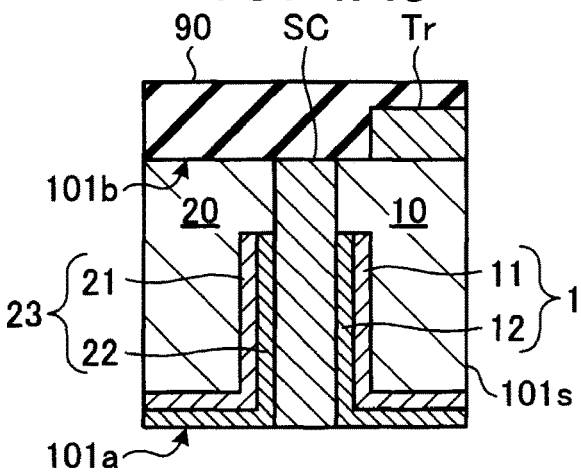
FIG. 4A3
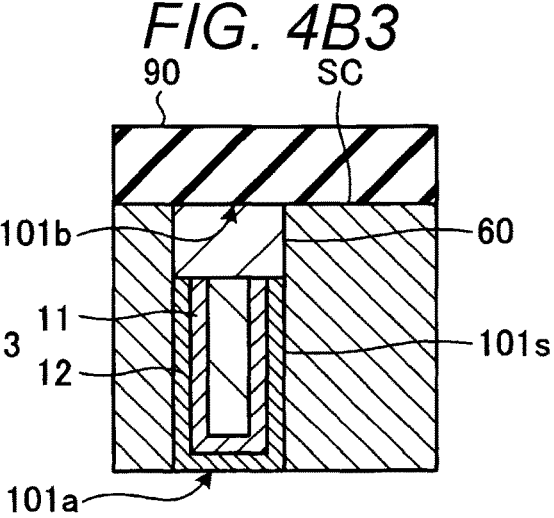
FIG. 4B3

FIG. 5A1
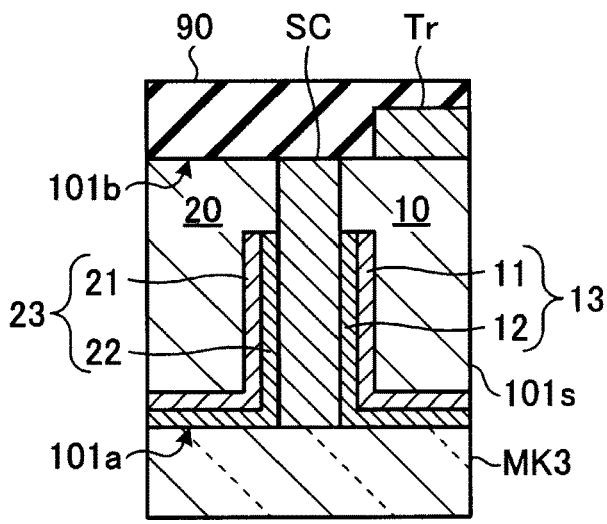
FIG. 5B1
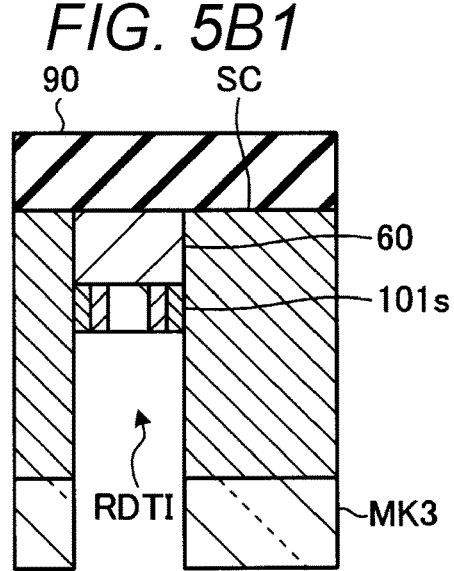
FIG. 5A2
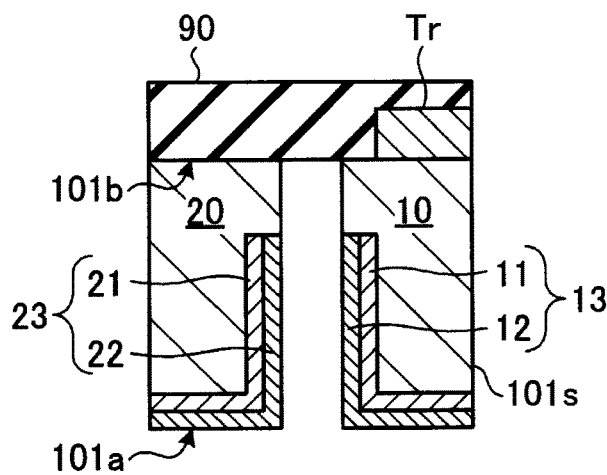
FIG. 5B2
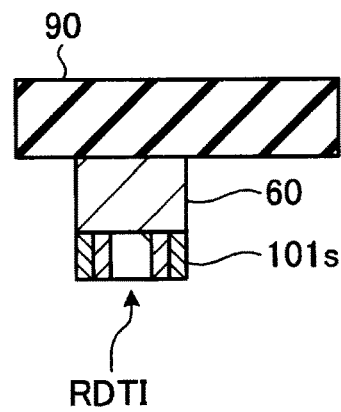
FIG. 5A3
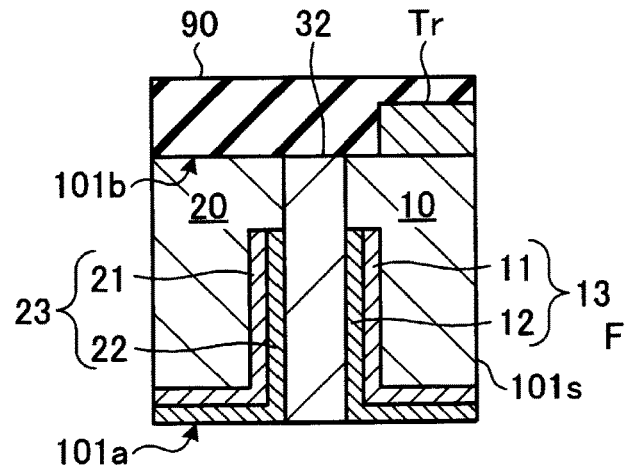
FIG. 5B3
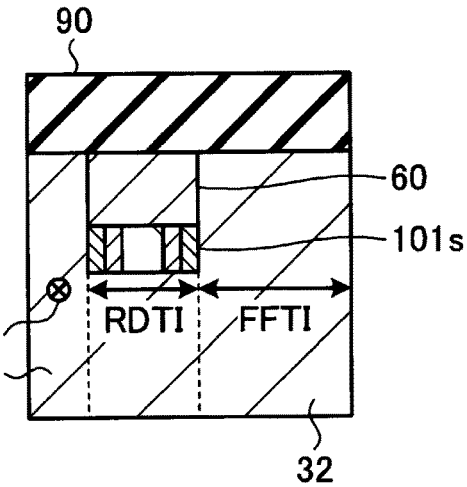

SOLID-STATE IMAGING ELEMENT, METHOD OF MANUFACTURING SOLID-STATE IMAGING ELEMENT, AND ELECTRONIC DEVICE

CROSS REFERENCE TO RELATED APPLICATIONS

This application is a national stage application under 35 U.S.C. 371 and claims the benefit of PCT Application No. PCT/JP2019/044911 having an international filing date of 15 Nov. 2019, which designated the United States, which PCT application claimed the benefit of Japanese Patent Application No. 2018-226788, filed 3 Dec. 2018, the entire disclosures of each of which are incorporated herein by reference.

TECHNICAL FIELD

The present disclosure relates to a solid-state imaging element, a method of manufacturing a solid-state imaging element, and an electronic device.

BACKGROUND ART

There is a known technique of forming a PN junction layer along a light shielding structure that shields each of pixels of a solid-state imaging element so as to enhance a saturation charge amount Qs in a photoelectric conversion element such as a photodiode on each of the pixels (for example, refer to PTL 1).

CITATION LIST

Patent Literature

PTL 1: JP 2015-162603A

SUMMARY

Technical Problem

The structure disclosed in PTL 1, however, has a disadvantage that no PN junction layer is formed on a light incident side of the photoelectric conversion element, and thus has room for further improvement with regard to the saturation charge amount Qs of the photoelectric conversion element.

Therefore, the present disclosure proposes a solid-state imaging element capable of improving the saturation charge amount Qs in the photoelectric conversion element, a manufacturing method of the solid-state imaging element, and an electronic device.

Solution to Problem

According to an embodiment of the present disclosure, there is provided an imaging device including a photoelectric conversion region disposed in a substrate and having a first conductivity type. The imaging device also includes a first region having a second conductivity type and disposed in the substrate at a first side of the photoelectric conversion region in a cross sectional view, where the first side of the photoelectric conversion region is opposite to a light-incident side of the photoelectric conversion region and the second conductivity type is opposite to the first conductivity type. The imaging device also includes a second region having the second conductivity type at a higher impurity concentration than the first region and disposed in the substrate around three sides of the photoelectric conversion region other than the first side of the photoelectric conversion region in the cross-sectional view. Additionally, the imaging device also includes a light shielding structure that penetrates through the substrate and that is adjacent to sidewalls of the second region. The imaging device also includes a third region between the second region and the photoelectric conversion region. The third region has the first conductivity type at a higher impurity concentration than the photoelectric conversion region. A memory is disposed in the substrate and has the first conductivity type, and the imaging device includes a first transfer transistor that transfers charge from the photoelectric conversion region to the memory along with a second transfer transistor that transfers charge from the memory to a readout circuit. The second transfer transistor includes a gate having a portion embedded in the first region and coupled to the photoelectric conversion region. The imaging device includes a third region having the second conductivity type and the third region is disposed in the substrate around three sides of the memory in the cross-sectional view. The imaging device further includes a fourth region disposed around the three sides of the photoelectric conversion region and having the first conductivity type at a higher impurity concentration than the photoelectric conversion region. The imaging device includes a fifth region disposed around the three sides of the memory and having the first conductivity type at a higher impurity concentration than the memory. The light shielding structure includes a portion between the photoelectric conversion region and the memory and the portion is adjacent to three sides of the memory in the cross-sectional view. The imaging device includes a gate of the first transfer transistor and a gate of the second transfer transistor which include portions on the first region. The imaging device also includes an insulation layer disposed over the gates of the first and second transfer transistors.

According to an aspect of the present disclosure, there is provided an imaging device comprising a photoelectric conversion region disposed in a substrate and having a first conductivity type, a first region having a second conductivity type and disposed in the substrate at a first side of the photoelectric conversion region in a cross sectional view. The first side of the photoelectric conversion region is opposite to a light-incident side of the photoelectric conversion region, and the second conductivity type is opposite the first conductivity type. The imaging device includes a light shielding structure that penetrates through the substrate and the light shielding structure is adjacent to sidewalls of the first region. A third region exists between the second region and the light-incident side of the photoelectric conversion region and has the first conductivity type at a higher impurity concentration than the photoelectric conversion region. The imaging device also includes a memory having the first conductivity type disposed in the substrate adjacent to the photoelectric conversion region and the memory is configured to store charge generated by the photoelectric conversion region. The imaging device includes a third region having the second conductivity type and disposed in the substrate around three sides of the memory in a cross-sectional view. The imaging device includes a fourth region between the second region and the light incident side of the photoelectric conversion region and has the first conductivity type at a higher impurity concentration than the photoelectric conversion region. The imaging device includes a fifth region disposed around the three sides of the memory and having the first conductivity type at a higher impurity concentration than the memory. The light shielding structure is disposed around three sides of the memory in the cross-sectional view. According to an aspect of the present disclosure, there is provided a method comprising forming a stack of a semiconductor substrate, an insulator, and a semiconductor layer. The method includes forming an implant region of a first conductivity type in the semiconductor layer, and forming at least one groove in the implant region to define a pixel including a photoelectric conversion region and a memory. The method includes forming first regions of a second conductivity type in the at least one groove along three sides of the memory and on at least a light-incident side of the photoelectric conversion region. The second conductivity type is opposite the first conductivity type. The method includes forming a light-shielding structure on sidewalls of the first regions. The method includes prior to forming the first region, forming a through-hole through the semiconductor layer and the insulator to a desired depth in the semiconductor substrate, depositing a material into the through hole, and removing the insulator to form a gap between the semiconductor substrate and the semiconductor layer. Forming the first regions includes forming a first insulating a layer in the at least one groove and in the gap, where the first insulating layer has impurities of the second conductivity type. The method includes annealing the first insulating layer. The method includes forming a first insulating layer in the at least one groove and in the gap, where the first insulating layer has impurities of the first conductivity type. The method includes annealing the first insulating layer to create a second region of the first conductivity type having an impurity concentration higher than the implant region. The method also includes forming a second insulating layer in the at least one groove, where the second insulating layer has impurities of a second conductivity type opposite the first conductivity type. The method includes annealing the second insulating layer.

BRIEF DESCRIPTION OF DRAWINGS

FIG. 1C is a schematic view illustrating a portion of another example of the solid-state imaging element according to the first embodiment of the present disclosure.

FIGS. 2A1 to 2D3 are a flowchart illustrating an example of a manufacturing processing procedure of the solid-state imaging element according to the first embodiment of the present disclosure.

FIGS. 3A1 to 3D3 are a flowchart illustrating an example of a manufacturing processing procedure of the solid-state imaging element according to the first embodiment of the present disclosure.

FIGS. 4A1 to 4B3 are a flowchart illustrating an example of a manufacturing processing procedure of the solid-state imaging element according to the first embodiment of the present disclosure.

FIGS. 5A1 to 5B3 are a flowchart illustrating an example of a manufacturing processing procedure of the solid-state imaging element according to the first embodiment of the present disclosure.

DESCRIPTION OF EMBODIMENTS

Figure 1A:
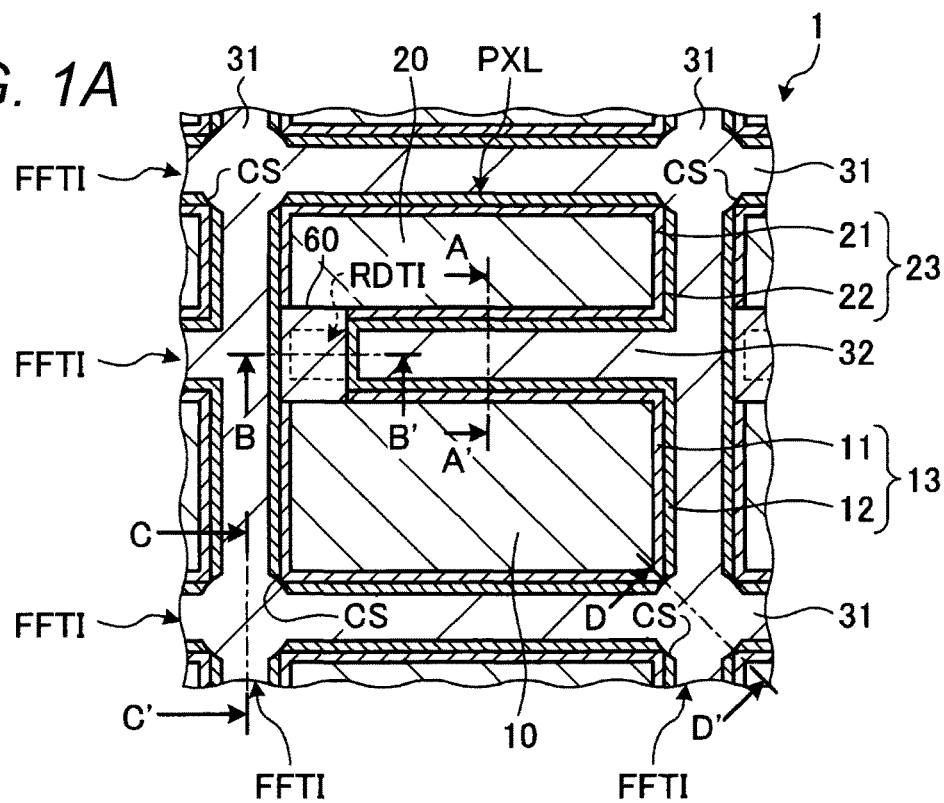
FIG. 1A is a schematic view illustrating a portion of a solid-state imaging element according to a first embodiment of the present disclosure.

Hereinafter, embodiments of the present disclosure will be described in detail with reference to the drawings. Note that in each of the following embodiments, the same portions are denoted by the same reference numerals, and redundant explanations are omitted.

First Embodiment

A solid-state imaging element according to a first embodiment will be described with reference to FIGS. 1A to 5B3. (Exemplary Configuration of Solid-State Imaging Element)

Figure 1B:
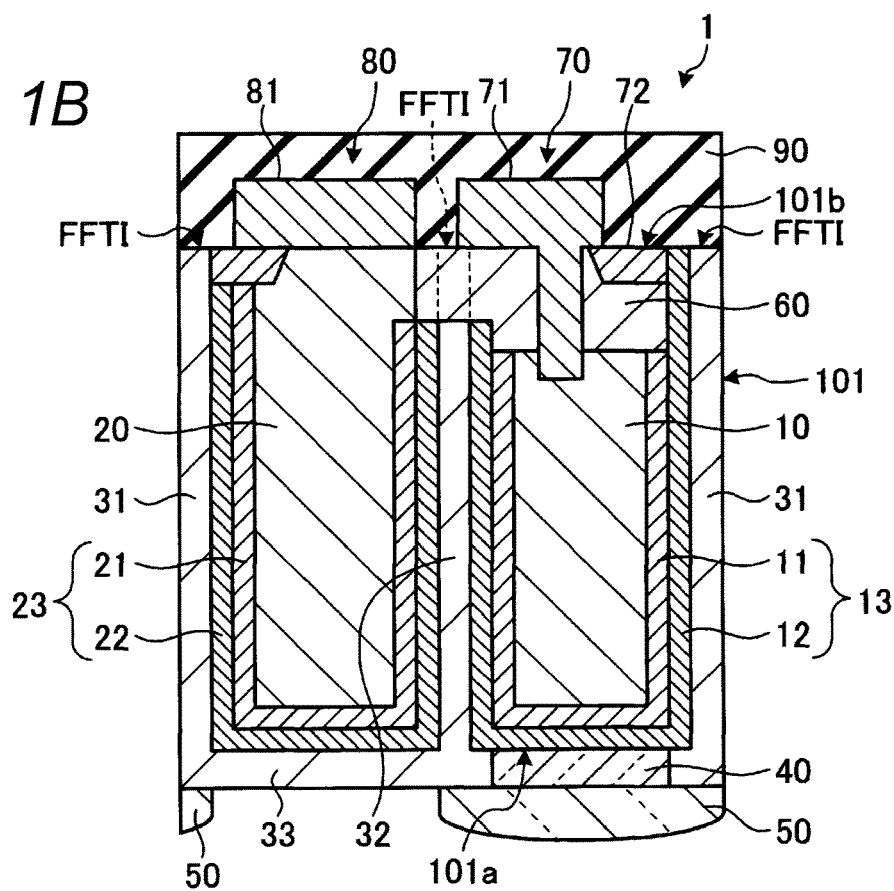
FIG. 1B is a schematic view illustrating a portion of a solid-state imaging element according to a first embodiment of the present disclosure.

FIGS. 1A to 1C are schematic views each illustrating a portion of a solid-state imaging element 1 according to the first embodiment of the present disclosure. FIG. 1A is a plan view illustrating a portion of the solid-state imaging element 1 according to the first embodiment. FIG. 1B is a cross-sectional view illustrating a portion of the solid-state imaging element 1 according to the first embodiment. Furthermore, FIG. 1C is a cross-sectional view illustrating a portion of another example of the solid-state imaging element 1 according to the first embodiment. Note that FIG. 1A omits illustration of each of transistors and an insulating film 90 or the like disposed on a surface of the solid-state imaging element 1. Furthermore, FIGS. 1B and 1C both illustrate transfer transistors 70 and 80 and a groove FFTI between a photoelectric conversion element (or photoelectric conversion region) 10 and a memory 20. These components, however, are not provided on an identical cross section in practice and in this sense, the cross-sectional views of FIGS. 1B and 1C are merely schematic.

As illustrated in FIGS. 1A and 1B, the solid-state imaging element 1 includes a plurality of pixels PXL. Each of the pixels PXL has a rectangular shape in a top view, for example, and includes a set of the photoelectric conversion elements 10 and the memory 20. The plurality of pixels PXL is arranged in a matrix.

More specifically, the solid-state imaging element 1 includes a silicon base (or substrate) 101 as a semiconductor base having a main surface 101a as a light incident surface. The silicon base 101 is a plate-shaped member having main surfaces 101a and 101b. As will be described later, the silicon base 101 includes a silicon layer on a Buried Oxide (BOX) layer of a Silicon On Insulator (SOI) substrate, or the like, for example.

The solid-state imaging element 1 includes a plurality of light shielding structures 31 and 32 arranged along a thickness direction of the silicon base 101. The light shielding structure 31 is provided in the groove FFTI of the silicon base 101 surrounding one pixel PXL in a rectangular shape.

The light shielding structure 32 is provided in the groove FFTI and a groove RDTI of the silicon base 101 separating the photoelectric conversion element 10 from the memory 20 included in one pixel PXL. The groove FFTI penetrates the silicon base 101. The groove RDTI is formed in the silicon base 101 to a predetermined depth from the main surface 101a. The light shielding structures 31 and 32 have a stacked structure of a metal film and an insulating film such as a $SiO_2$ film, for example, and suppress transmission of light between the pixels PXL or transmission of light between the photoelectric conversion element 10 and the memory 20 within the pixel PXL.

The solid-state imaging element 1 includes an N-type photoelectric conversion element 10 of a first conductivity type disposed in a region surrounded by the main surface 101a and the light shielding structures 31 and 32. That is, an example of the photoelectric conversion element 10 is a photodiode or the like including an N-type semiconductor region. The photoelectric conversion element 10 converts received light into electric charge corresponding to the amount of light received by photoelectric conversion.

The solid-state imaging element 1 includes a PN junction layer 13 arranged continuously along the main surface 101a and the light shielding structures 31 and 32 on the photoelectric conversion element 10 side of the main surface 101a and the light shielding structures 31 and 32. "Continuously arranged" state is a state where the PN junction layer 13 on the main surface 101a side and the PN junction layer 13 on the light shielding structures 31 and 32 side are integrally formed without having a boundary such as an interface, for example. The PN junction layer 13 extends along the light shielding structures 31 and 32, for example, to the main surface 101b on the side opposite to the main surface 101a of the silicon base 101. Note that the PN junction layer 13 does not exist in a region where a transfer transistor 70 or the like described later on the main surface 101b side is disposed.

The PN junction layer 13 includes a $P^+$-type layer 12 as a layer having a higher impurity concentration than normal and as a layer of a second conductivity type different from the first conductivity type. As shown, the $P^+$-type layer 12 is around three sides of the photoelectric conversion element 10. The PN junction layer 13 includes an $N^+$-type layer 11 as a layer having a higher impurity concentration than normal and as a layer of the first conductivity type having an impurity concentration higher than that of the photoelectric conversion element 10. The $N^+$-type layer 11 is disposed on more toward the photoelectric conversion element 10 side on the main surface 101a and the light shielding structures 31 and 32 of the silicon base 101, than the $P^+$-type layer 12.

In this specification, the $N^+$-type layer 11 represents a layer containing more N-type impurities than the layer described as an N-type layer or the like, for example. In other words, the $N^+$-type layer 11 means that the carrier (electron) density is higher than the layer described as an N-type layer or the like, for example. In this specification, the $P^+$-type layer 12 represents a layer containing more P-type impurities than the layer described as a P-type layer or the like, for example. In other words, the $P^+$-type layer 12 means that the carrier (hole) density is higher than the layer described as a P-type layer or the like, for example.

Specifically, the $P^+$-type layer 12 having a higher impurity concentration than normal means that at least part of the $P^+$-type layer 12 contains impurities of $1\times10^{16}/cm^3$ or more, for example. Furthermore, the $P^+$-type layer 12 has a carrier (hole) concentration of $1\times10^{16}/cm^3$ or more at a boundary between the main surface 101a and the light shielding structures 31 and 32. The $N^+$-type layer 11 having a higher impurity concentration than normal means that at least part of the $N^+$-type layer 11 contains impurities of $1\times10^{16}/cm^3$ or more, for example. Furthermore, the $N^+$-type layer 11 has a higher impurity concentration than the photoelectric conversion element 10.

More specifically, the $N^+$-type layer 11 and the $P^+$-type layer 12 are solid phase diffusion layers. The solid phase diffusion layer is a diffusion layer formed by solid phase diffusion which will be described later, being a layer containing impurities of a predetermined conductivity type at a high concentration. In this manner, joining the $N^+$-type layer 11 having a high impurity concentration with the $P^+$-type layer 12 having a high impurity concentration would allow steep transition from one conductivity type to the other conductivity type in the PN junction layer 13. Note that, for constituting a PN junction having steep transition of the conductivity type as described above, one conductivity-type layer may have high concentration of impurities as described later.

In another example illustrated in FIG. 1C, the $P^+$-type layer 12 having a higher impurity concentration than normal has a PN junction with an N-type region 10n as a portion of the photoelectric conversion element 10 having normal impurity concentration, for example. In other words, it is possible to consider that the PN junction layer 13n is formed with the $P^+$-type layer 12 and the N-type region 10n.

In addition, returning to FIGS. 1A and 1B, the concentration of the impurities contained in the PN junction layer 13 at an intersection CS where the plurality of light shielding structures 31 intersects each other is lower than the concentration of the impurities contained in the PN junction layer 13 at portions other than the intersection CS. Here, "The intersection CS at which the plurality of light shielding structures 31 intersects each other" here represents four corners of the pixel PXL configured in a rectangular shape, for example. In all or a portion of the rectangular corners, the impurity concentration of the PN junction layer 13 is lower than the other portions.

In addition, in some cases, a region of the partitioned pixel PXL is a recessed shape recessed toward the pixel PXL side at the intersection CS where the plurality of light shielding structures 31 intersects each other. As described above, the light shielding structure 31 surrounds the pixel PXL in a rectangular shape and defines a region where the photoelectric conversion element 10 is disposed. In some cases, at the intersection CS corresponding to an apex of the rectangular pixel PXL, the apex itself might be missing.

The solid-state imaging element 1 includes a light shielding structure 33 disposed on a main surface 101a of a region of the silicon base 101 not overlapping with the photoelectric conversion element 10. The light shielding structure 33 may penetrate through the silicon base 101 and be adjacent to sidewalls of the $P^+$-type layer 12. The light shielding structure 33 has a stacked structure of a metal film and an insulating film such as a $SiO_2$ film, for example, and suppresses transmission of light from the light incident surface. The light shielding structure 33 may be configured continuously with or separately from the light shielding structures 31 and 32. A color filter 40 is disposed on the main surface 101a of a region of the silicon base 101 overlapping with the photoelectric conversion element 10. On the opposite side of the silicon base 101 of the color filter 40, an on-chip lens 50 is disposed. The on-chip lens 50 collects light emitted from the outside toward the silicon base 101. The collected light is guided to the photoelectric conversion element 10 provided in the silicon base 101 via the color filter 40.

The solid-state imaging element 1 includes a memory 20 as a charge holding unit of N-type being a first conductivity type disposed in a region separated from the photoelectric conversion element 10 by the light shielding structure 32 and surrounded by the light shielding structure 33 and the light shielding structures 31 and 32. That is, the memory 20 includes an N-type semiconductor region, for example. The memory 20 temporarily holds electric charge photoelectrically converted by the photoelectric conversion element 10. This makes it possible to adopt a global shutter system that performs simultaneous exposure and collective reading to be used in the solid-state imaging element 1.

The solid-state imaging element 1 includes a PN junction layer 23 disposed continuously along the light shielding structure 33 and the light shielding structures 31 and 32, on the memory 20 sides of the light shielding structure 33 and the light shielding structures 31 and 32. The PN junction layer 23 extends along the light shielding structures 31 and 32, for example, to the main surface 101b on the side opposite to the main surface 101a of the silicon base 101. Note that the PN junction layer 23 does not exist in a region where a transfer transistor 80 or the like described later on the main surface 101b side is disposed.

The PN junction layer 23 includes a P$^+$-type layer 22 as a layer having a higher impurity concentration than normal and as a layer of a second conductivity type different from the first conductivity type. The P$^+$-type layer 22 having a higher impurity concentration than normal means that at least part of the P$^+$-type layer 22 contains impurities of $1\times10^{16}$/cm$^3$ or more, for example. Furthermore, the P$^+$-type layer 22 has a carrier (hole) concentration of $1\times10^{16}$/cm$^3$ or more at a boundary between the main surface 101a and the light shielding structures 31 and 32. The PN junction layer 23 includes an N$^+$-type layer 21 as a layer of a first conductivity type having an impurity concentration higher than normal and having a higher impurity concentration than the memory 20. The N$^+$-type layer 21 having a higher impurity concentration than normal means that at least part of the N$^+$-type layer 21 contains impurities of $1\times10^{16}$/cm$^3$ or more, for example. The N$^+$-type layer 21 is arranged on more toward the memory 20 side than the P$^+$-type layer 22 of the light shielding structure 33 and the light shielding structures 31 and 32. The N$^+$-type layer 21 and the P$^+$-type layer 22 are solid phase diffusion layers. Joining the N$^+$-type layer 21 having a high impurity concentration with the P$^+$-type layer 22 having a high impurity concentration would allow sharp transition from one conductivity type to the other conductivity type in the PN junction layer 23. Note that, for constituting a PN junction having steep transition of the conductivity type as described above, one conductivity-type layer may have high concentration of impurities as described later.

In another example illustrated in FIG. 1C, the P$^+$-type layer 22 having a higher impurity concentration than normal has a PN junction with an N-type region 20n as a portion of the memory 20 having normal impurity concentration, for example. In other words, it is possible to consider that the PN junction layer 23n is formed with the P$^+$-type layer 22 and the N-type region 20n.

Furthermore, returning to FIGS. 1A and 1B, at the intersection CS where the plurality of light shielding structures 31 intersects each other, the concentration of the impurity contained in the PN junction layer 23 is lower than the concentration of the impurity contained in the PN junction layer 23 at a portion other than the intersection CS.

In addition, as described above, the light shielding structure 31 surrounds the pixel PXL in a rectangular shape and defines a region where the memory 20 is disposed. In addition, at the intersection CS, an apex itself of the rectangular pixel PXL might be missing in some cases.

The solid-state imaging element 1 includes transfer transistors 70 and 80 arranged on the main surface 101b side of the silicon base 101. The solid-state imaging element 1 includes pixel transistors (not illustrated) such as an amplification transistor, a reset transistor, and a selection transistor, which are disposed on the main surface 101b side of the silicon base 101. These transistors including the transfer transistors 70 and 80 are covered with an insulating film 90.

The transfer transistor 80 includes a gate electrode 81 and an N-type source region/drain region in the silicon base 101 at the end of the gate electrode 81. The transfer transistor 80 transfers the charge generated in the photoelectric conversion element 10 to the memory 20.

The transfer transistor 70 is disposed on a P-type semiconductor region 60 provided above the photoelectric conversion element 10 in the silicon base 101. The P-type semiconductor region 60 is disposed at a first side of the photoelectric conversion element 10, which is a side that is opposite to a light-incident side of the photoelectric conversion element 10. The transfer transistor 70 includes a gate electrode 71 and a floating diffusion (FD) 72 as an N-type source region. The gate electrode 71 of the transfer transistor 70 is embedded in the semiconductor region 60 and is coupled to the photoelectric conversion element 10. For example, the gate electrode 71 extends into the photoelectric conversion element 10. The transfer transistor 70 transfers the charge accumulated in the memory 20 to the FD 72.

The pixel transistor performs processing of reading the electric signal transferred from the transfer transistor 70. An amplification transistor (not illustrated) generates an amplified signal corresponding to the electric charge supplied from the FD 72. This amplified signal is transmitted as an electric signal from the photoelectric conversion element 10 to upper layer wiring (not illustrated) or the like via a selection transistor (not illustrated). A reset transistor (not illustrated) resets (initializes) the potential of the gate electrode of the amplification transistor to the power supply potential. The reset transistor also functions as a transistor to reset the potential of the FD 72.

The electric signal transmitted to the upper layer wiring or the like is processed by a logic circuit (not illustrated) or the like disposed around the plurality of pixels PXL, and is output from the solid-state imaging element 1, for example. Alternatively, the logic circuit may be provided on a substrate or the like which is a separate member from the silicon base 101, and may be stacked above the silicon base 101, for example.

(Example of Manufacturing Processing of Solid-State Imaging Element)

Next, an example of manufacturing processing of the solid-state imaging element 1 according to the first embodiment will be described with reference to FIGS. 2A1 to 5B3. FIGS. 2A1 to 5B3 are flowcharts each illustrating an example of a manufacturing processing procedure of the solid-state imaging element 1 according to the first embodiment of the present disclosure. Note that views in leftmost portions in FIGS. 2A1 to 5B3 are cross-sectional views taken along line A-A' of FIG. 1A in the manufacturing processing of the solid-state imaging element 1. The second views from the left in FIGS. 2A1 to 5B3 are cross-sectional views taken along line B-B' in FIG. 1A in the manufacturing processing of the solid-state imaging element 1. The third views from the left in FIGS. 2A1 to 3D3 are cross-sectional views taken along line C-C' in FIG. 1A in the manufacturing processing of the solid-state imaging element 1. Views in rightmost portions in FIGS. 2A1 to 3D3 are cross-sectional views taken along line D-D' of FIG. 1A in the manufacturing processing of the solid-state imaging element 1.

As illustrated in FIGS. 2A1, 2B1, 2C1, and 2D1, what is prepared is an SOI substrate 100 as a stacked substrate having a BOX layer 102 as an insulating layer and a silicon layer 101s as a semiconductor layer arranged in this order on a silicon substrate 103 as a semiconductor substrate. The silicon layer 101s is a portion to be the silicon base 101 of the solid-state imaging element 1 through the processing described below.

On the main surface 101b side of the silicon layer 101s of the SOI substrate 100, a hardmask MK 1 having a hole pattern is formed. An example of the hardmask MK 1 can be an insulating film such as a SiN film.

Next to form is a pillar PL that penetrates the silicon layer 101s and the BOX layer 102 to reach a predetermined depth of the silicon substrate 103. More specifically, dry etching is performed onto the silicon layer 101s and the BOX layer 102, down to a predetermined depth of the silicon substrate 103 with the hardmask MK 1 as a mask so as to form a through hole. Subsequently, the through hole is filled with polysilicon or the like, so as to form the pillar PL. In this manner, the pillar PL penetrates from the main surface 101b on the upper surface side of the silicon layer 101s down to a predetermined depth of the silicon substrate 103, making it possible to suppress separation of the silicon layer 101s and the silicon substrate 103 in subsequent processing.

After removal of the hardmask MK 1, an N-type impurity is diffused into the silicon layer 101s of the SOI substrate 100 by ion implantation or the like from the main surface 101b side, so as to form a photoelectric conversion element 10 as an N-type region. At this time, the memory 20 is also formed by ion implantation or the like from the main surface 101b side of the silicon layer 101s.

As illustrated in FIGS. 2A2, 2B2, 2C2, and 2D2, a hardmask MK 2 having an opening at a portion corresponding to the groove FFTI is formed on the main surface 101b side of the silicon layer 101s of the SOI substrate 100. An example of the hardmask MK 2 can be an insulating film such as a SiN film.

Next to form is a plurality of the grooves FFTI penetrating the silicon layer 101s and defining a region in which the photoelectric conversion element 10 is formed with the pillar PL as an intersection. At this time, a plurality of grooves FFTI for defining a region in which the memory 20 is formed is also formed with the pillar PL as an intersection. More specifically, using the hardmask MK 2 as a mask, dry etching is performed on the silicon layer 101s to form the groove FFTI that penetrates the silicon layer 101s to reach the BOX layer 102.

With this processing, regions corresponding to substantially rectangular pixels PXL (refer to FIG. 1A) are arranged in a matrix, with the pillars PL being arranged at least in a portion of the four corners of the rectangular region.

More specifically, the groove FFTI separating the photoelectric conversion element 10 from the memory 20 is formed in a region illustrated in FIG. 2A2. In a region illustrated in FIG. 2B2, a groove FFTI for defining a region of the pixel PXL is formed on the left side of the drawing, and a groove FFTI separating the photoelectric conversion element 10 from the memory 20 is formed on the right side of the drawing, across the silicon layer 101s by the grooves FFTIs.

In a region illustrated in FIGS. 2C2 and 2D2, a groove FFTI defining the region of the pixel PXL is formed so as to extend in four directions across the pillar PL. The pillar PL comes into contact with the intersection CS where the apexes of the four pixels PXL face each other in a direction orthogonal to the individual grooves FFTI.

After formation of the groove FFTI, a side wall protective film MKa extending from a lower end of the hardmask MK 2 to a predetermined depth is formed on a side wall of the silicon layer 101s exposed by the groove FFTI, in a region where various transistors are to be formed. The side wall protective film MKa is obtained by forming a SiN film or the like by chemical vapor deposition (CVD), for example.

The BOX layer 102 is removed as illustrated in FIGS. 2A3, 2B3, 2C3, and 2D3. The BOX layer 102 can be removed by wet etching the SOI substrate 100 with a solution such as Buffered Hydrogen Fluoride (BHF), for example. BHF is a mixture of $NH_4F$ and HF.

This leads to generation of a gap between the silicon layer 101s and the silicon substrate 103, and at this position, the pillar PL penetrating the silicon layer 101s is disposed at the intersection CS of the groove FFTI and reaches a predetermined depth of the silicon substrate 103. This pillar PL functions to maintain a state where the silicon layer 101s and the silicon substrate 103 are connected. This prevents the silicon layer 101s from peeling off from the silicon substrate 103 (or alternatively, reduces peeling), and furthermore, prevents the silicon layers 101s partitioned into a plurality of rectangles from falling apart (or alternatively, reduces falling apart).

As illustrated in FIGS. 3A1, 3B1, 3C1, and 3D1, solid phase diffusion is applied on the side wall exposed toward the groove FFTI of the silicon layer 101s and on the main surface 101a that is exposed by removal of the BOX layer 102 of the silicon layer 101s. As a result, N-type impurity as the first conductivity type is diffused from the side wall of the silicon layer 101s and the main surface 101a to a predetermined depth.

More specifically, an insulating film ON containing a large amount of N-type impurities is formed on an exposed surface of the silicon layer 101s by isotropic CVD or the like. An example of this insulating film ON is Phosphorus Silicon Glass (PSG) containing a large amount of phosphorus, or the like. Note that the insulating film ON is also formed on the surface of the pillar PL, the surface of the silicon substrate 103 exposed by removing the BOX layer 102, the surface of the hardmask MK 2, or the like.

When the whole of the silicon layer 101s is annealed with the insulating film ON formed on the exposed surface of the silicon layer 101s, N-type impurities are diffused into the silicon layer 101s from the insulating film ON. A method of diffusing impurities from a solid film containing a large amount of impurities of a predetermined conductivity type into a semiconductor layer such as the silicon layer 101s is referred to as solid phase diffusion.

After the insulating film ON is removed by BHF or the like, the entire silicon layer 101s is further annealed. This allows the N-type impurities to be diffused from the exposed surface to a predetermined depth of the silicon layer 101s. This leads to formation of the $N^+$-type layers 11 and 21.

At this time, N-type impurities are not diffused on the side wall upper portion of the silicon layer 101s protected by the side wall protective film MKa. This ensures regions for forming the transfer transistors 70 and 80 or the like. Note that while N-type impurities are diffused also in the pillar PL where the insulating film ON is formed on the surface and also in the silicon substrate 103, this would have no influence on subsequent processing. Moreover, N-type impurities are scarcely diffused in the silicon layer 101s at the intersection CS of the grooves FFTI in which the pillar PL is arranged. That is, the N$^+$-type layers 11 and 21 are formed at a lower concentration than in the others in the silicon layer 101s of the intersection CS.

As illustrated in FIGS. 3A2, 3B2, 3C2, and 3D2, solid phase diffusion is applied on the side wall exposed toward the groove FFTI of the silicon layer 101s and on the main surface 101a that is exposed by removal of the BOX layer 102 of the silicon layer 101s. As a result, P-type impurities of a second conductivity type different from the first conductivity type are diffused from the side wall and the main surface 101a of the silicon layer 101s to a depth shallower than the predetermined depth. Note that diffusing the P-type impurities fully on the side surface of the groove FFTI of the silicon layer 101s would improve the dark-time characteristic. Therefore, this solid phase diffusion may be performed after the side wall protective film MKa on the side surface of the groove FFTI has been removed and exposed.

More specifically, an insulating film OP containing a large amount of P-type impurities is formed on the exposed surface of the silicon layer 101s by isotropic CVD or the like. An example of this insulating film OP is a Boron Silicon Glass (BSG) containing a large amount of boron, or the like. Note that the insulating film OP is also formed on the surface of the pillar PL, the surface of the silicon substrate 103 exposed by removing the BOX layer 102, the surface of the hardmask MK 2, or the like.

When the whole of the silicon layer 101s is annealed with the insulating film OP formed on the exposed surface of the silicon layer 101s, P-type impurities are diffused into the silicon layer 101s from the insulating film OP. At this time, the diffusion depth from the exposed surface of the silicon layer 101s is set to be shallower than the diffusion depth of the N-type impurity. With this setting, the P$^+$-type layers 12 and 22 are formed on a surface layer of the silicon layer 101s while leaving the N$^+$-type layers 11 and 21 at deeper positions of the silicon layer 101s.

Here, solid phase diffusion is used to diffuse a large amount of P-type impurities onto the surface layer of the silicon layer 101s originally being the N$^+$-type layers 11 and 21 so as to respectively turn the layer to P$^+$-type layers 12 and 22. Accordingly, the P$^+$-type layers 12 and 22 contain N-type impurities as well, in addition to the P-type impurities. The N$^+$-type layers 11 and 21 remaining in the inner portion of the silicon layer 101s substantially contain N-type impurities alone.

At this time, P-type impurities are not diffused on the side wall upper portion of the silicon layer 101s protected by the side wall protective film MKa. This ensures regions for forming the transfer transistors 70 and 80 or the like. Note that while P-type impurities are diffused also in the pillar PL where the insulating film OP is formed on the surface and also in the silicon substrate 103, this would have no influence on subsequent processing. Moreover, P-type impurities are scarcely diffused in the silicon layer 101s at the intersection CS of the grooves FFTI in which the pillar PL is arranged. That is, the P$^+$-type layers 12 and 22 are formed at a lower concentration than in the others in the silicon layer 101s of the intersection CS.

As illustrated in FIGS. 3A3, 3B3, 3C3, and 3D3, the insulating film OP is removed by BHF or the like.

As illustrated in FIGS. 4A1 and 4B1, the gap between the silicon layer 101s and the silicon substrate 103 and the groove FFTI are filled with a filling film SC such as SiO$_2$ film and a polysilicon film. Specifically, an SiO$_2$ film or the like is formed on the exposed surface of the silicon layer 101s and the exposed surface of the silicon substrate 103, and thereafter, a polysilicon film or the like is formed. Filling the filling film SC in this manner makes it possible to suppress entry of particles or the like into the groove FFTI or the like in subsequent processing.

As illustrated in FIGS. 4A2 and 4B2, various transistors or the like are formed on the main surface 101b side of the silicon layer 101s after the hardmask MK 2 has been removed. Specifically, a P-type impurities are implanted into the region illustrated in FIG. 4B2 by ion implantation or the like to form a P-type semiconductor region 60. Furthermore, transfer transistors 70 and 80 (refer to FIG. 1B) and various pixel transistors Tr are formed in the regions illustrated in FIGS. 4A2 and 4B2. In addition, N-type impurities are implanted into the region illustrated in FIGS. 4A2 and 4B2 by ion implantation or the like to form a source region and a drain region (not illustrated). Thereafter, the entire main surface 101b of the silicon layer 101s is covered with the insulating film 90.

The following steps are back surface treatment applied from the main surface 101a side of the silicon layer 101s, that is, from the silicon substrate 103 side.

As illustrated in FIGS. 4A3 and 4B3, the silicon substrate 103 and the filling film SC are ground from the back side of the silicon substrate 103 opposite to the silicon layer 101s so as to expose the main surface 101a of the silicon layer 101s.

As illustrated in FIGS. 5A1 and 5B1, a resist mask MK 3 having an opening as formation region of the groove RDTI is formed on the main surface 101a side of the silicon layer 101s. Subsequently, using the resist mask MK 3 as a mask, dry etching is performed on the silicon layer 101s from the main surface 101a side so as to form a groove RDTI separating the photoelectric conversion element 10 from the memory 20.

The filling film SC is removed as illustrated in FIGS. 5A2 and 5B2. At this time, the pillar PL is also removed. Since the insulating film 90 and the like are formed on the main surface 101b of the silicon layer 101s, the removal of the pillar PL would not allow the silicon layer 101s to fall apart.

As illustrated in FIGS. 5A3 and 5B3, an insulating film such as a SiO$_2$ film and a metal film are formed in the grooves FFTI and RDTI in this order, and thus, the light shielding structures 31 and 32 are formed.

More specifically, the light shielding structure 32 separating the photoelectric conversion element 10 from the memory 20 is formed in a region illustrated in FIG. 5A3. In a region illustrated in FIG. 5B3, a light shielding structure 32 that separates the photoelectric conversion element 10 from the memory 20 is formed in the grooves RDTI and FFTI extending in parallel to the surface of the drawing, and the light shielding structure 31 that defines the pixel PXL is formed in the groove FFTI extending perpendicular to the surface of the drawing.

Thereafter, other structures are added to the silicon layer 101s as a base. That is, an insulating film and a metal film are formed in this order on a region of the main surface 101a of the silicon base 101 overlapping with the memory 20, so as to form the light shielding structure 33. The color filter 40 and the on-chip lens 50 are formed in a region of the main surface 101a of the silicon layer 101s overlapping with the photoelectric conversion element 10.

This completes the manufacturing processing of the solid-state imaging element 1 according to the first embodiment.

Effects

Next, effects of the solid-state imaging element 1 of the first embodiment will be described with reference to the configuration of PTL 1.

The semiconductor device of PTL 1 has an intermediate concentration N-type region and a P-type region on a side wall of an inter-pixel light shielding structure formed between pixels. This configuration is provided to form an intense electric field region to hold the charge in the photodiode, thereby improving the saturation charge amount Qs. However, the saturation charge amount Qs is still insufficient in the electric field enhancement on the side wall alone, and further improvement of the saturation charge amount Qs is desired.

Accordingly, it is conceivable to form a PN junction layer also on a bottom surface side of the photoelectric conversion element such as a photodiode so as to intensify the electric field. However, it is extremely difficult to form a high concentration PN junction layer continuously on different surfaces of the photoelectric conversion element, that is, on the side surface side and the bottom surface side.

The solid-state imaging element 1 according to the first embodiment includes the PN junction layer 13 that continuously surrounds the side surface and the bottom surface of the photoelectric conversion element 10. The PN junction layer 13n or the PN junction layer 13 contains at least the high concentration $P^+$-type layer 12 or contains both the high concentration $N^+$-type layer 11 and the high concentration $P^+$-type layer 12, leading to steep transition from one of mutually differing conductivity types to the other between the PN junction layers 13 or between the PN junction layers 13n, resulting in further enhancement of the electric field on the side surface and the bottom surface of the photoelectric conversion element 10. In addition, since the continuous PN junction layer 13 is formed across the side surface and the bottom surface of the photoelectric conversion element 10, the confinement of the electric charge generated by the photoelectric conversion element 10 is further enhanced. Accordingly, the saturation charge amount Qs in the photoelectric conversion element 10 can be improved.

The solid-state imaging element 1 according to the first embodiment includes the PN junction layer 23 that continuously surrounds a side surface and a bottom surface of the memory 20. The PN junction layer 23n or the PN junction layer 23 contains at least the high concentration $P^+$-type layer 22 or contains both the high concentration $N^+$-type layer 21 and the high concentration $P^+$-type layer 22, leading to steep transition from one of mutually differing conductivity types to the other between the PN junction layers 23 or between the PN junction layers 23n, resulting in enhancement of the electric field on the side surface and the bottom surface of the memory 20. In addition, since the continuous PN junction layer 23 is formed on the side surface and the bottom surface of the memory 20, the confinement of charges held in the memory 20 is further enhanced. Accordingly, the saturation charge amount Qs in the memory 20 can be improved.

The solid-state imaging element 1 according to the first embodiment is manufactured by using the SOI substrate 100. In the manufacturing processing of the solid-state imaging element 1, the pillar PL that penetrates the silicon layer 101s and reaches the silicon substrate 103 having a predetermined depth is formed. With this configuration, the silicon layer 101s and the silicon substrate 103 are joined together after removal of the BOX layer 102. In addition, since the gap between the silicon layer 101s and the silicon substrate 103 is maintained, it is possible to continuously form the insulating films ON and OP also on the main surface 101a being the bottom surface, in addition to on the side surface of the silicon layer 101s. This makes it possible to form the PN junction layers 13 and 23 that continuously cover the side surface and the bottom surface of the photoelectric conversion element 10 and the memory 20.

There are cases where the PN junction layers 13 and 23 have lower concentration than in the others at the intersection CS of the light shielding structure 31 on which the pillar PL is formed, that is, at the apex of the pixel PXL. Still, the low concentration regions of the PN junction layers 13 and 23 are limited, and thus, would have no substantial influence on the saturation charge amount Qs of the photoelectric conversion element 10 and the memory 20.

Second Embodiment

Figure 6A:
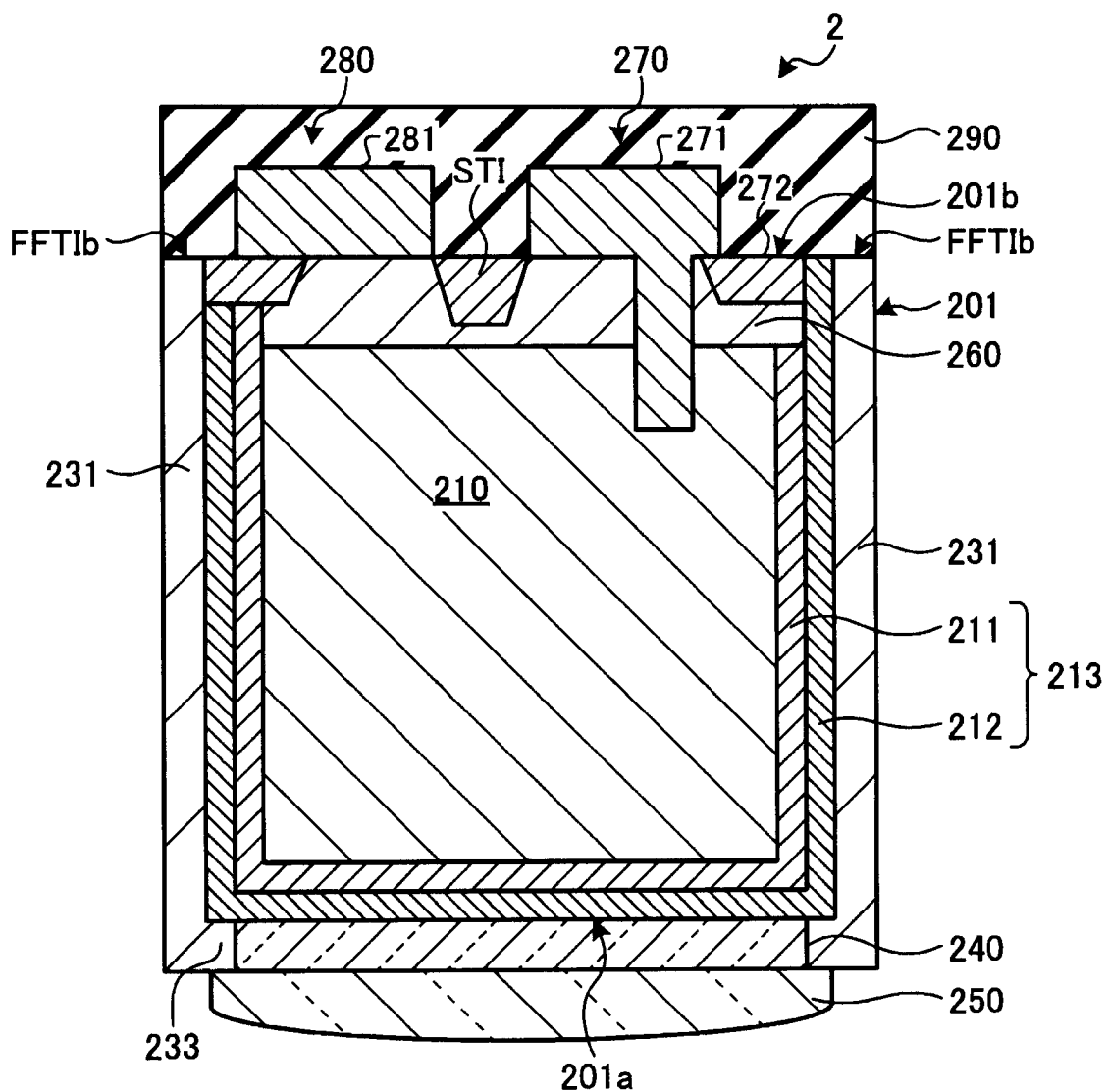
FIG. 6A is a schematic view illustrating a portion of a solid-state imaging element according to a second embodiment of the present disclosure.
Figure 6B:
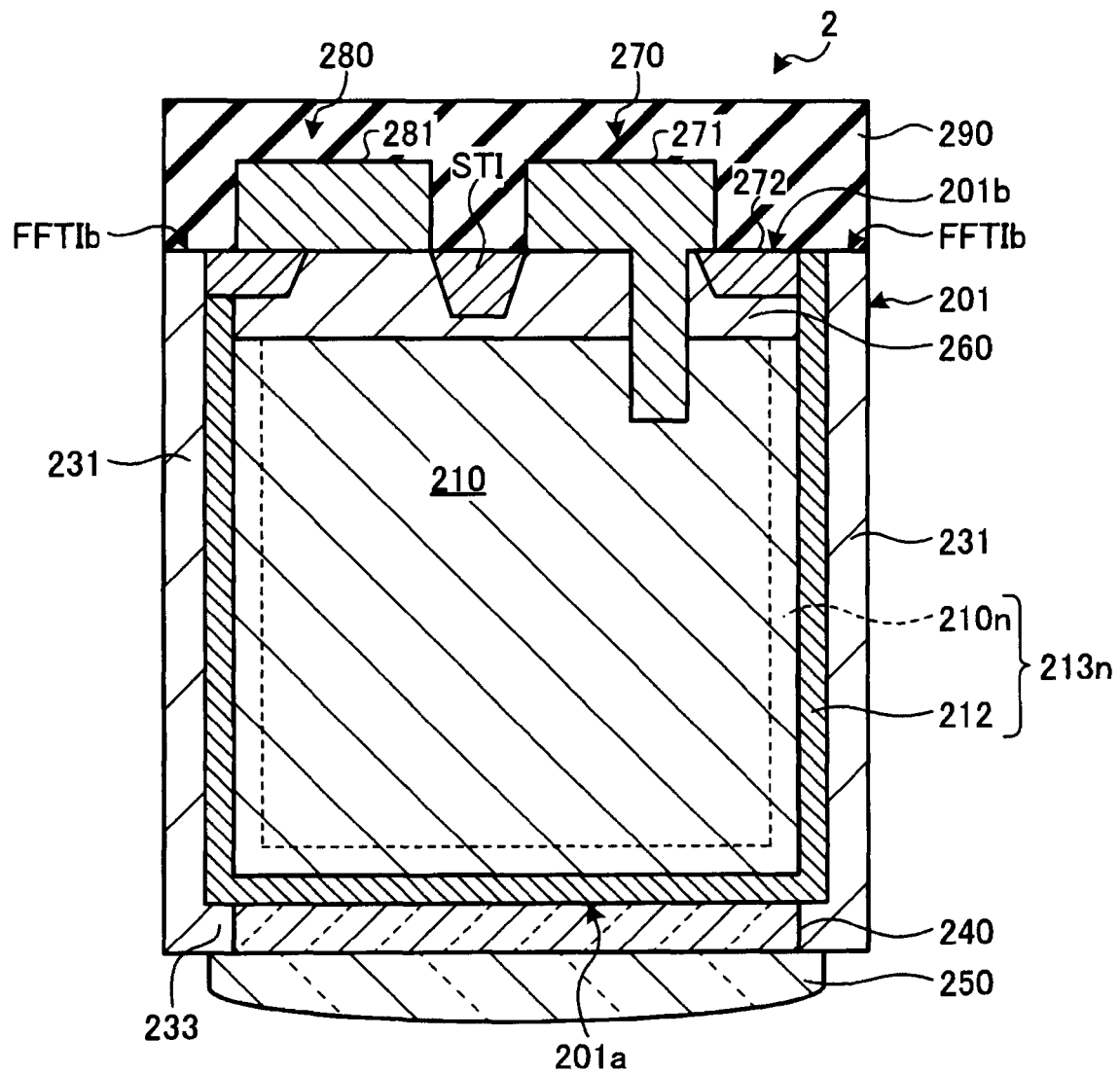
FIG. 6B is a schematic view illustrating a portion of a solid-state imaging element according to a second embodiment of the present disclosure.

Next, a solid-state imaging element 2 according to a second embodiment will be described with reference to FIGS. 6A and 6B. FIGS. 6A and 6B are schematic views illustrating a portion of the solid-state imaging element 2 according to the second embodiment of the present disclosure. FIG. 6A is a cross-sectional view illustrating a portion of the solid-state imaging element 2 according to the second embodiment. FIG. 6B is a cross-sectional view illustrating a portion of another example of the solid-state imaging element 2 according to the second embodiment. The solid-state imaging element 2 of the second embodiment is different from the above-described first embodiment in that it does not include a memory.

As illustrated in FIG. 6A, the solid-state imaging element 2 includes: a silicon base 201 as a base of a semiconductor having a main surface 201a as a light incident surface; and a plurality of light shielding structures 231 arranged along the thickness direction of the silicon base 201. The light shielding structure 231 is provided in a groove FFTIb of the silicon base 201 surrounding one pixel in a rectangular shape. The groove FFTIb penetrates the silicon base 201. The light shielding structure 231 has a stacked structure of a metal film and an insulating film such as a $SiO_2$ film, for example, and suppresses transmission of light between the pixels.

The solid-state imaging element 2 includes an N-type photoelectric conversion element 210 of a first conductivity type disposed in a region surrounded by the main surface 201a and the light shielding structure 231. For example, one photoelectric conversion element 210 is included in one pixel.

The solid-state imaging element 2 includes a PN junction layer 213 arranged continuously along the main surface 201a and the light shielding structures 231 on the photoelectric conversion element 210 side of the main surface 201a and the light shielding structures 231. The PN junction layer 213 extends along the light shielding structure 231, for example, to the main surface 201b on the side opposite to the main surface 201a of the silicon base 201.

The PN junction layer 213 includes a $P^+$-type layer 212 having a higher impurity concentration than normal. The $P^+$-type layer 212 having a higher impurity concentration than normal means that at least part of the $P^+$-type layer 212 contains impurities of $1 \times 10^{16}/cm^3$ or more, for example. The PN junction layer 213 includes an $N^+$-type layer 211 which has a higher impurity concentration than normal and has a higher impurity concentration than the photoelectric conversion element 210. The $N^+$-type layer 211 having a higher impurity concentration than normal means that at least part of the $N^+$-type layer 211 contains impurities of $1 \times 10^{16}/cm^3$ or more, for example. The $N^+$-type layer 211 is disposed on more toward the photoelectric conversion element 210 side on the main surface 201a and the light shielding structures 231 of the silicon base 201, than the $P^+$-type layer 212. The N+-type layer 211 and the P+-type layer 212 are solid phase diffusion layers. Joining the N+-type layer 211 with the P+-type layer 212 would allow sharp transition from one conductivity type to the other conductivity type in the PN junction layer 213. Note that, for constituting a PN junction having steep transition of the conductivity type as described above, one conductivity-type layer may have high concentration of impurities as described later.

In another example illustrated in FIG. 6B, the P+-type layer 212 having a higher impurity concentration than normal has a PN junction with an N-type region 210n as a portion of the photoelectric conversion element 210 having normal impurity concentration, for example. In other words, it is possible to consider that the PN junction layer 213n is formed with the P+-type layer 212 and the N-type region 210n.

Furthermore, returning to FIG. 6A, the concentration of the impurities contained in the PN junction layer 213 at an intersection where the plurality of light shielding structures 231 intersects each other is lower than the concentration of the impurities contained in the PN junction layer 213 at portions other than the intersection. The impurity concentration of the PN junction layer 213 is lower than in the others in all or a portion of the intersections at four corners of the rectangular pixel.

In addition, in some cases, a region of the partitioned pixel is a recessed shape recessed toward the pixel side at the intersection where the plurality of light shielding structures 231 intersects each other. That is, at the intersection, there are cases where the apex itself of the rectangular pixel is missing.

The solid-state imaging element 2 includes a light shielding structure 233 disposed on the main surface 201a of a region of the silicon base 201 not overlapping with the photoelectric conversion element 210. A color filter 240 is disposed on the main surface 201a of a region of the silicon base 201 overlapping with the photoelectric conversion element 210. On the opposite side of the silicon base 201 of the color filter 240, an on-chip lens 250 is disposed.

The solid-state imaging element 2 includes a transfer transistor 270 arranged on the main surface 201b side of the silicon base 201. The solid-state imaging element 2 includes a pixel transistor 280, such as an amplification transistor, a reset transistor, and a selection transistor, disposed on the main surface 201b side of the silicon base 201. The transfer transistor 270 and the pixel transistor 280 are disposed on a P-type semiconductor region 260 provided above the photoelectric conversion element 210 in the silicon base 201, and further covered with an insulating film 290. The transfer transistor 270 and the pixel transistor 280 are electrically separated from each other by an isolation region STI.

The transfer transistor 270 includes a gate electrode 271 and a floating diffusion (FD) 272 as an N-type source region. The gate electrode 271 of the transfer transistor 270 extends into the photoelectric conversion element 210, for example. The transfer transistor 270 transfers the charge generated in the photoelectric conversion element 210 to the pixel transistor 280. The FD 272 temporarily holds the electric charge generated in the photoelectric conversion element 210.

The pixel transistor 280 includes a gate electrode 281 and an N-type source region/drain region. The pixel transistor 280 receives the transfer of the charges generated in the photoelectric conversion element 210 and performs processing of reading an electric signal corresponding to the amount of light received by the photoelectric conversion element 210.

Similarly to the solid-state imaging element 1 of the first embodiment, the solid-state imaging element 2 of the second embodiment is also manufactured by using an SOI substrate. That is, after removal of the BOX layer, solid phase diffusion is performed on the bottom surface and the side surface of the silicon layer to be the silicon base 201 while joining the silicon layer and the silicon substrate by the pillar.

The solid-state imaging element 2 according to the second embodiment also includes the PN junction layer 213 or the PN junction layer 213n continuously arranged from the bottom surface to the side surface of the photoelectric conversion element 210. Accordingly, effects similar to the case of the first embodiment are achieved.

Third Embodiment

Figure 7A:
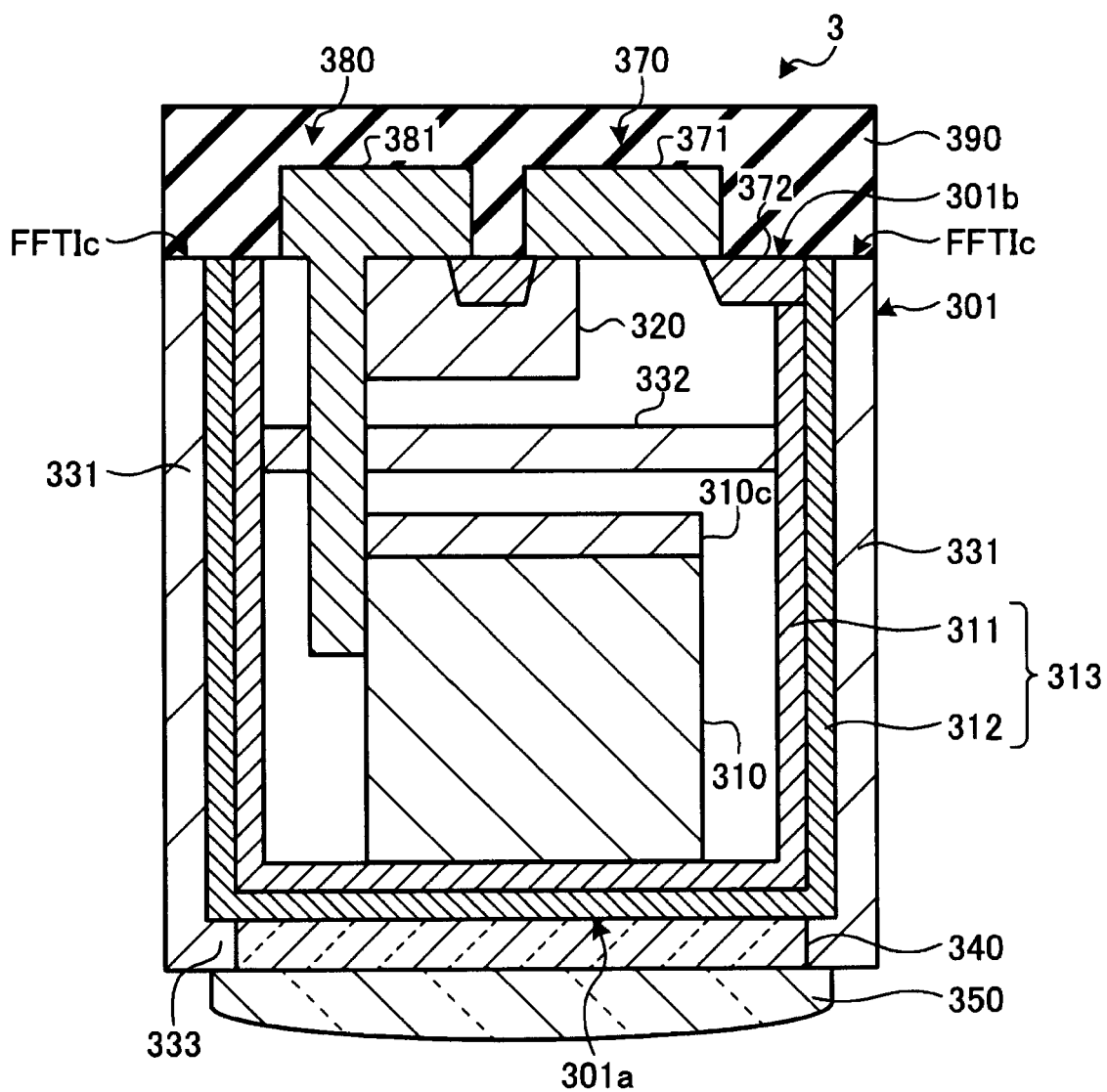
FIG. 7A is a schematic view illustrating a portion of a solid-state imaging element according to a third embodiment of the present disclosure.
Figure 7B:
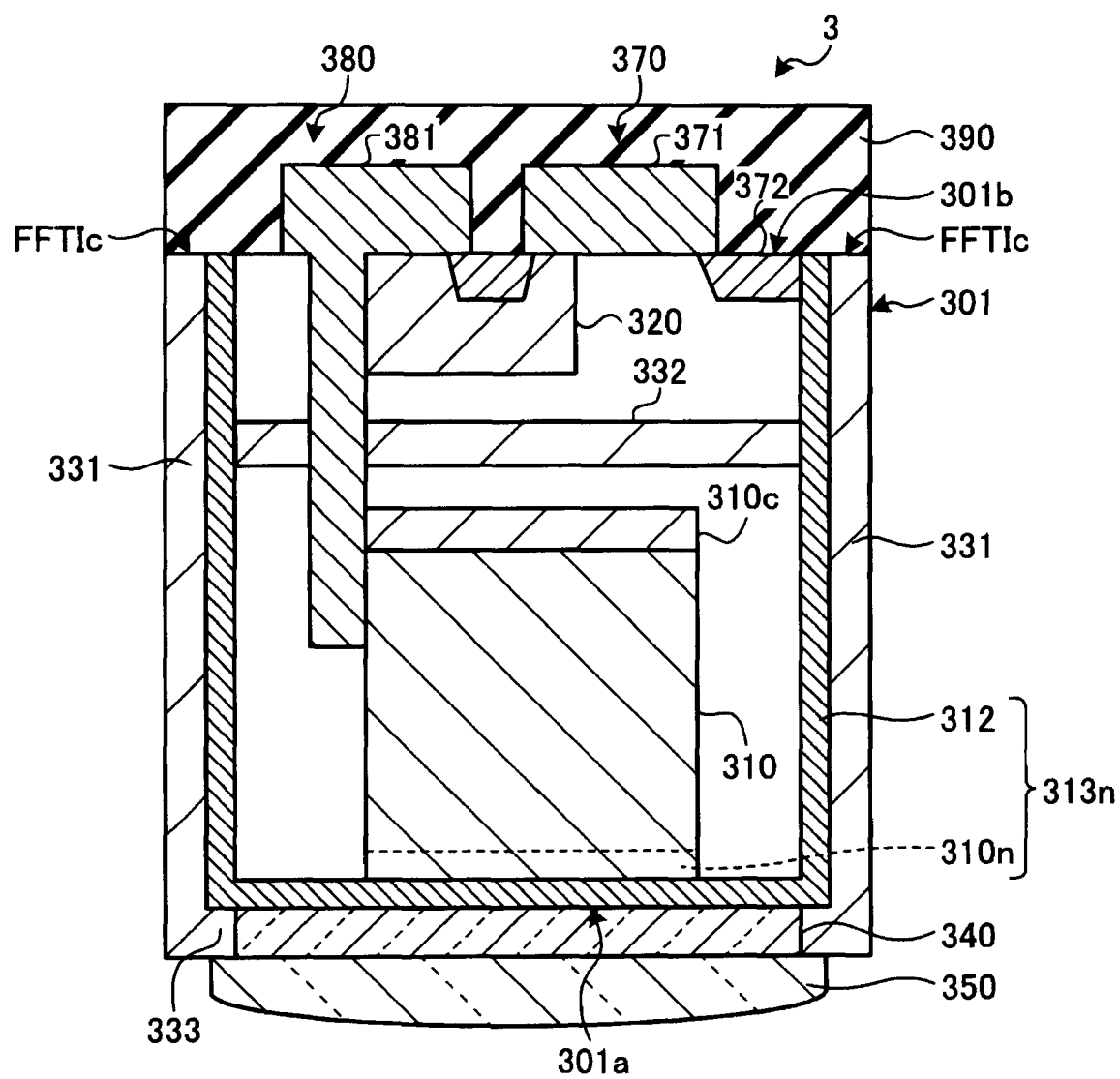
FIG. 7B is a schematic view illustrating a portion of a solid-state imaging element according to a third embodiment of the present disclosure.

Next, a solid-state imaging element 3 according to a third embodiment will be described with reference to FIGS. 7A and 7B. FIGS. 7A and 7B are schematic views illustrating a portion of the solid-state imaging element 3 according to the third embodiment of the present disclosure. FIG. 7A is a cross-sectional view illustrating a portion of the solid-state imaging element 3 according to the third embodiment. FIG. 7B is a cross-sectional view illustrating a portion of another example of the solid-state imaging element 3 according to the third embodiment. The solid-state imaging element 3 according to the third embodiment is different from the above-described first embodiment in that a memory 320 is vertically stacked on a photoelectric conversion element 310.

As illustrated in FIG. 7A, the solid-state imaging element 3 includes: a silicon base 301 as a base of a semiconductor having a main surface 301a as a light incident surface; and a plurality of light shielding structures 331 arranged along the thickness direction of the silicon base 301. The light shielding structure 331 is provided in a groove FFTIc of the silicon base 301 surrounding one pixel in a rectangular shape. The groove FFTIc penetrates the silicon base 301. The light shielding structure 331 has a stacked structure of a metal film and an insulating film such as a SiO$_2$ film, for example, and suppresses transmission of light between the pixels.

The solid-state imaging element 3 includes an N-type photoelectric conversion element 310 of a first conductivity type disposed in a region surrounded by the main surface 301a and the light shielding structure 331. On the photoelectric conversion element 310, a P-type semiconductor region 310c is disposed in contact with the photoelectric conversion element 310. For example, one photoelectric conversion element 310 is included in one pixel.

The solid-state imaging element 3 includes a light shielding structure 332 arranged in a direction along the main surface 301a of the silicon base 301, in a region above the photoelectric conversion element 310 of the silicon base 301. The light shielding structure 332 separates the photoelectric conversion element 310 from the memory 320, included in one pixel. The light shielding structure 331 has a stacked structure of a metal film and an insulating film such as a SiO$_2$ film, for example, and suppresses transmission of light between the photoelectric conversion element 310 and the memory 320.

The solid-state imaging element 3 includes the memory 320 as a charge holding unit of N-type arranged in a region separated from the photoelectric conversion element 310 by the light shielding structure 332 and surrounded by the light shielding structure 332 and the light shielding structures 331. That is, the memory 320 includes, for example, an N-type semiconductor region. For example, one memory 320 is included in one pixel.

The solid-state imaging element 3 includes a PN junction layer 313 arranged continuously along the main surface 301a and the light shielding structures 331 on the photoelectric conversion element 310 side and the memory 320 side of the main surface 301a and the light shielding structures 331. The PN junction layer 313 extends along the light shielding structure 331, for example, to the main surface 301b on the side opposite to the main surface 301a of the silicon base 301.

The PN junction layer 313 includes a P$^+$-type layer 312 having a higher impurity concentration than normal. The P$^+$-type layer 312 having a higher impurity concentration than normal means that at least part of the P$^+$-type layer 312 contains impurities of $1\times10^{16}/cm^3$ or more, for example. The PN junction layer 313 includes an N$^+$-type layer 311 having a higher impurity concentration than normal and having a higher impurity concentration than the photoelectric conversion element 310 and the memory 320. The N$^+$-type layer 311 having a higher impurity concentration than normal means that at least part of the N$^+$-type layer 311 contains impurities of $1\times10^{16}/cm^3$ or more, for example. The N$^+$-type layer 311 is disposed on more toward the photoelectric conversion element 310 side and the memory 320 side on the main surface 301a and the light shielding structures 331 of the silicon base 301, than the P$^+$-type layer 312. The N$^+$-type layer 311 and the P$^+$-type layer 312 are solid phase diffusion layers. Joining the N$^+$-type layer 311 with the P$^+$-type layer 312 would allow steep transition from one conductivity type to the other conductivity type in the PN junction layer 313. Note that, for constituting a PN junction having steep transition of the conductivity type as described above, one conductivity-type layer may have high concentration of impurities as described later.

In another example illustrated in FIG. 7B, the P$^+$-type layer 312 having a higher impurity concentration than normal has a PN junction with an N-type region 310n as a portion of the photoelectric conversion element 310 having normal impurity concentration, for example. In other words, it is possible to consider that the PN junction layer 313n is formed with the P$^+$-type layer 312 and the N-type region 310n.

Furthermore, returning to FIG. 7A, the concentration of the impurities contained in the PN junction layer 313 at an intersection where the plurality of light shielding structures 331 intersects each other is lower than the concentration of the impurities contained in the PN junction layer 313 at portions other than the intersection. The impurity concentration of the PN junction layer 313 is lower than in the others in all or a portion of the intersections at four corners of the rectangular pixel.

In addition, in some cases, a region of the partitioned pixel is a recessed shape recessed toward the pixel side at the intersection where the plurality of light shielding structures 331 intersects each other. That is, at the intersection, there are cases where the apex itself of the rectangular pixel is missing.

The solid-state imaging element 3 includes a light shielding structure 333 disposed on the main surface 301a of a region of the silicon base 301 not overlapping with the photoelectric conversion element 310. A color filter 340 is disposed on the main surface 301a of a region of the silicon base 301 overlapping with the photoelectric conversion element 310. On the opposite side of the silicon base 301 of the color filter 340, an on-chip lens 350 is disposed.

The solid-state imaging element 3 includes transfer transistors 370 and 380 arranged on the main surface 301b side of the silicon base 301. The solid-state imaging element 3 includes pixel transistors (not illustrated) such as an amplification transistor, a reset transistor, and a selection transistor, which are disposed on the main surface 301b side of the silicon base 301. These transistors including the transfer transistors 370 and 380 are covered with an insulating film 390.

The transfer transistor 370 includes a gate electrode 371 and a floating diffusion (FD) 372 as an N-type source region. The transfer transistor 370 transfers the charge accumulated in the memory 320 to the FD 372.

The transfer transistor 380 includes a gate electrode 381 and an N-type source region/drain region. The gate electrode 381 of the transfer transistor 380 penetrates the light shielding structure 332, for example, and is in contact with an end portion of the photoelectric conversion element 310. The transfer transistor 380 transfers the charge accumulated in the FD 372 to the memory 320.

Similarly to the solid-state imaging element 1 of the first embodiment, the solid-state imaging element 3 is also manufactured by using an SOI substrate. That is, after removal of the BOX layer, solid phase diffusion is performed on the bottom surface and the side surface of the silicon layer to be the silicon base 301 while joining the silicon layer and the silicon substrate by the pillar.

The solid-state imaging element 3 according to the third embodiment also includes the PN junction layer 313 or the PN junction layer 313n continuously arranged from the bottom surface to the side surface of the photoelectric conversion element 310. Accordingly, effects similar to the case of the first embodiment are achieved.

Fourth Embodiment

Figure 8:
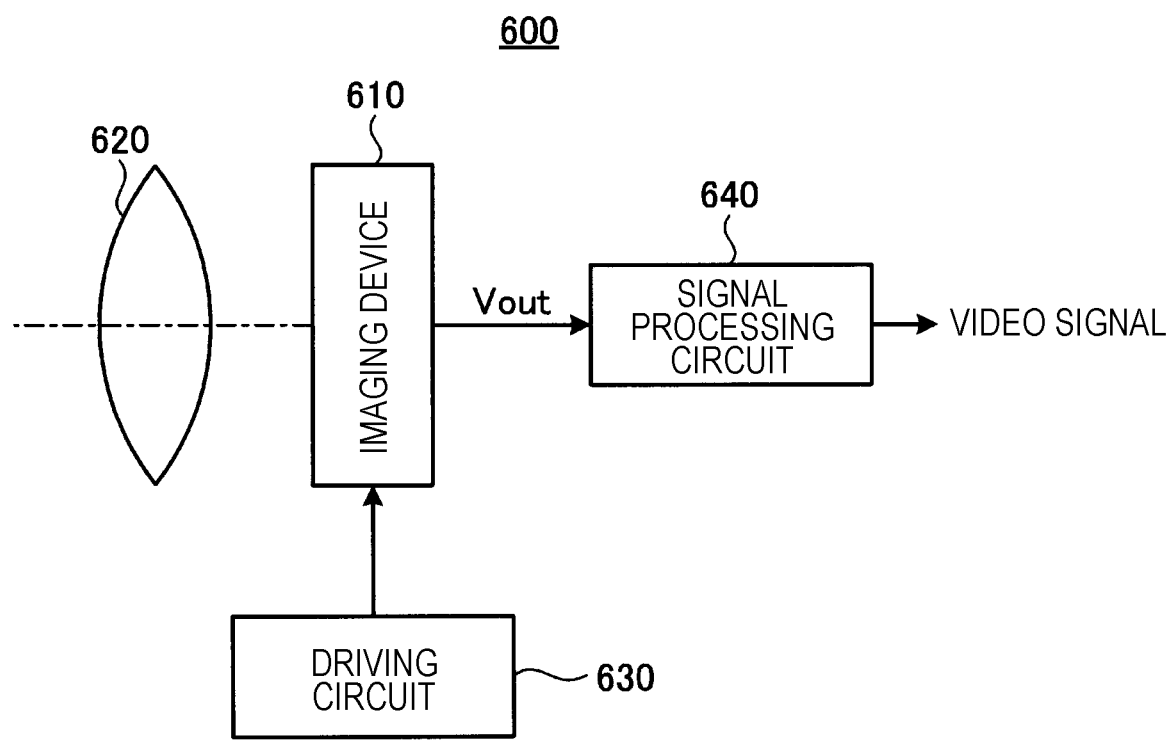
FIG. 8 is a block diagram illustrating an example of a configuration of a camera according to a fourth embodiment of the present disclosure.

Next, a camera 600 as an electronic device according to a fourth embodiment will be described with reference to FIG. 8. FIG. 8 is a block diagram illustrating an example of a configuration of the camera 600 according to the fourth embodiment of the present disclosure. The camera 600 is equipped with the solid-state imaging element 1 or the like of the above-described first embodiment.

As illustrated in FIG. 8, the camera 600 includes an imaging device 610, an optical system 620, a driving circuit 630, and a signal processing circuit 640.

The imaging device 610 is implementable by applying the solid-state imaging elements 1 to 3 or the like respectively described in the first to third embodiments.

The optical system 620 guides incident light to a pixel region of the imaging device 610. The optical system 620 is a lens or the like that captures incident light from a subject and forms an image on an imaging surface of the imaging device 610.

The driving circuit 630 drives the imaging device 610. Specifically, the driving circuit 630 includes a timing generator that generates various timing signals including a start pulse and a clock pulse for driving the circuit in the imaging device 610. Then, the driving circuit 630 drives the imaging device 610 by using a predetermined timing signal.

The signal processing circuit 640 performs processing on an output signal from the imaging device 610. The image signal processed by the signal processing circuit 640 is recorded on a recording medium such as a memory, for example. The image information recorded on the recording medium is saved in the form of a hard copy by a printer or the like. The video signal processed by the signal processing circuit 640 is displayed as a moving image on a monitor formed with a liquid crystal display or the like.

The camera 600 is equipped with the solid-state imaging element 1 or the like of the first embodiment, so as to implement the high precision camera 600.

Note that effects described here in the present specification are provided for purposes of exemplary illustration and are not intended to be limiting. Still other effects may also be contemplated.

OTHER EMBODIMENTS

While each of the above-described solid-state imaging elements 1 to 3 or the like of the first to third embodiments is a case where the photoelectric conversion element and the memory include the N-type semiconductor region, the present disclosure is not limited to this. The photoelectric conversion element and the memory may include a P-type semiconductor region. In this case, the conductivity types of other configurations are switched as appropriate. For example, the PN junction layer or the like disposed around the photoelectric conversion element and the memory may be configured such that the photoelectric conversion element side and the memory side portion is set as the $P^+$-type layer and the outside thereof is set as the $N^+$-type layer.

Note that the present technology may also be configured as follows.

(1)
An imaging device, comprising:
a photoelectric conversion region disposed in a substrate and having a first conductivity type;
a first region having a second conductivity type and disposed in the substrate at a first side of the photoelectric conversion region in a cross-sectional view, the first side of the photoelectric conversion region being opposite to a light-incident side of the photoelectric conversion region, the second conductivity type being opposite the first conductivity type;
a second region having the second conductivity type at a higher impurity concentration than the first region and disposed in the substrate around three sides of the photoelectric conversion region other than the first side of the photoelectric conversion region in the cross-sectional view; and
a light shielding structure that penetrates through the substrate and that is adjacent to sidewalls of the second region.

(2)
The imaging device of (1), further comprising:
a third region between the second region and the photoelectric conversion region, the third region having the first conductivity type at a higher impurity concentration than the photoelectric conversion region.

(3)
The imaging device of one or more of (1) to (2), further comprising:
a memory disposed in the substrate and having the first conductivity type; and
a first transfer transistor that transfers charge from the photoelectric conversion region to the memory; and
a second transfer transistor that transfers charge from the memory to a readout circuit.

(4)
The imaging device of one or more of (1) to (3), wherein the second transfer transistor includes a gate having a portion embedded in the first region and coupled to the photoelectric conversion region.

(5)
The imaging device of one or more of (1) to (4), further comprising:
a third region having the second conductivity type and disposed in the substrate around three sides of the memory in the cross-sectional view.

(6)
The imaging device of one or more of (1) to (5),
a fourth region disposed around the three sides of the photoelectric conversion region and having the first conductivity type at a higher impurity concentration than the photoelectric conversion region; and
a fifth region disposed around the three sides of the memory and having the first conductivity type at a higher impurity concentration than the memory.

(7)
The imaging device of one or more of (1) to (6), wherein the light shielding structure includes a portion between the photoelectric conversion region and the memory.

(8)
The imaging device of one or more of (1) to (7), wherein the light shielding structure is adjacent to three sides of the memory in the cross sectional view.

(9)
The imaging device of one or more of (1) to (8), wherein a gate of the first transfer transistor and a gate of the second transfer transistor include portions on the first region.

(10)
The imaging device of one or more of (1) to (9), further comprising:
an insulation layer disposed over the gates of the first and second transfer transistors.

(11)
An imaging device, comprising:
a photoelectric conversion region disposed in a substrate and having a first conductivity type;
a first region having a second conductivity type and disposed in the substrate at a first side of the photoelectric conversion region in a cross sectional view, the first side of the photoelectric conversion region being opposite to a light-incident side of the photoelectric conversion region, the second conductivity type being opposite the first conductivity type;
a second region having a second conductivity type and disposed on at least the light-incident side of the photoelectric conversion region, the second conductivity type being opposite the first conductivity type; and
a light shielding structure that penetrates through the substrate and that is adjacent to sidewalls of the first region.

(12)
The imaging device of (11), further comprising:
a third region between the second region and the light-incident side of the photoelectric conversion region, the third region having the first conductivity type at a higher impurity concentration than the photoelectric conversion region.

(13)
The imaging device of one or more of (11) to (12), further comprising:
a memory having the first conductivity type disposed in the substrate adjacent to the photoelectric conversion region and configured to store charge generated by the photoelectric conversion region; and
a third region having the second conductivity type and disposed in the substrate around three sides of the memory in a cross-sectional view.

(14)

The imaging device of one or more of (11) to (13), further comprising:
   a fourth region between the second region and the light-incident side of the photoelectric conversion region and having the first conductivity type at a higher impurity concentration than the photoelectric conversion region; and
   a fifth region disposed around the three sides of the memory and having the first conductivity type at a higher impurity concentration than the memory.

(15)

The imaging device of one or more of (11) to (14), wherein the light shielding structure is disposed around three sides of the memory in the cross sectional view.

(16)

A method, comprising:
   forming a stack of a semiconductor substrate, an insulator, and a semiconductor layer;
   forming an implant region of a first conductivity type in the semiconductor layer;
   forming at least one groove in the implant region to define a pixel including a photoelectric conversion region and a memory;
   forming first regions of a second conductivity type in the at least one groove along three sides of the memory and on at least a light-incident side of the photoelectric conversion region, the second conductivity type being opposite the first conductivity type; and
   forming a light-shielding structure on sidewalls of the first regions.

(17)

The method of one or more of (16), further comprising: prior to forming the first regions:
   forming a through-hole through the semiconductor layer and the insulator to a desired depth in the semiconductor substrate;
   depositing a material into the through-hole; and
   removing the insulator to form a gap between the semiconductor substrate and the semiconductor layer.

(18)

The method of one or more of (16) to (17), wherein forming the first regions includes:
   forming a first insulating layer in the at least one groove and in the gap, the first insulating layer having impurities of the second conductivity type; and
   annealing the first insulating layer.

(19)

The method of one or more of (16) to (18), further comprising:
   forming a first insulating layer in the at least one groove and in the gap, the first insulating layer having impurities of the first conductivity type; and
   annealing the first insulating layer to create a second region of the first conductivity type having an impurity concentration higher than the implant region.

(20)

The method of one or more of (16) to (19), wherein forming the first regions includes:
   forming a second insulating layer in the at least one groove, the second insulating layer having impurities of a second conductivity type opposite the first conductivity type; and
   annealing the second insulating layer.

REFERENCE SIGNS LIST 1, 1a, 2, 3 Solid-state imaging element
10, 210, 310 Photoelectric conversion element
11, 21, 111, 121, 211, 311 $N^+$-type layer
12, 22, 212, 312 $P^+$-type layer
13, 23, 113, 123, 213, 313 PN junction layer
20, 320 Memory
31, 32, 231, 331 Light shielding structure
33, 233, 332, 333 Light shielding structure
70, 80, 270, 370, 380 Transfer transistor
101, 201, 301 Silicon base

The invention claimed is:

1. An imaging device, comprising:
   a photoelectric conversion region disposed in a substrate and having a first conductivity type;
   a first region having a second conductivity type and disposed in the substrate at a first side of the photoelectric conversion region in a cross-sectional view, the first side of the photoelectric conversion region being opposite to a light-incident side of the photoelectric conversion region, the second conductivity type being opposite the first conductivity type;
   a second region having the second conductivity type at a higher impurity concentration than the first region disposed in the substrate, wherein in the cross-sectional view, the second region is disposed parallel to a right side, a left side, and the light-incident side of the photoelectric conversion region;
   a third region disposed between the second region and the right side, the left side, and the light-incident side of the photoelectric conversion region, the third region having the first conductivity type at a higher impurity concentration than the photoelectric conversion region, wherein the third region directly contacts the second region and the photoelectric conversion region; and
   a light shielding structure that penetrates through the substrate and that is adjacent to sidewalls of the second region.

2. The imaging device of claim 1, further comprising:
   a memory disposed in the substrate and having the first conductivity type;
   a first transfer transistor that transfers charge from the photoelectric conversion region to the memory; and
   a second transfer transistor that transfers charge from the memory to a readout circuit.

3. The imaging device of claim 2, wherein the second transfer transistor includes a gate having a portion embedded in the first region and coupled to the photoelectric conversion region.

4. The imaging device of claim 2, further comprising:
   a fourth region disposed around the right side, the left side, and the light-incident side of the photoelectric conversion region in the cross-sectional view, and having the first conductivity type at a higher impurity concentration than the photoelectric conversion region; and
   a fifth region disposed around a right side, a left side, and a light-incident side of the memory and having the first conductivity type at a higher impurity concentration than the memory.

5. The imaging device of claim 2, wherein the light shielding structure includes a portion between the photoelectric conversion region and the memory.

6. The imaging device of claim 5, wherein the light shielding structure is adjacent to three sides of the memory in the cross-sectional view.

7. The imaging device of claim 2, wherein a gate of the first transfer transistor and a gate of the second transfer transistor include portions on the first region.

8. The imaging device of claim 7, further comprising:
an insulation layer disposed over the gate of the first transistor and the gate of the second transfer transistor.

9. An imaging device, comprising:
a photoelectric conversion region disposed in a substrate and having a first conductivity type;
a first region having a second conductivity type and disposed in the substrate at a first side of the photoelectric conversion region in a cross-sectional view, the first side of the photoelectric conversion region being opposite to a light-incident side of the photoelectric conversion region, the second conductivity type being opposite the first conductivity type;
a second region having the second conductivity type and disposed on at least the light-incident side of the photoelectric conversion region, the second conductivity type being opposite the first conductivity type;
a third region between the second region and a right side, a left side, and a light-incident side of the photoelectric conversion region, the third region having the first conductivity type at a higher impurity concentration than the photoelectric conversion region, wherein the third region directly contacts the second region and the photoelectric conversion region; and
a light shielding structure that penetrates through the substrate and that is adjacent to sidewalls of the first region.

10. The imaging device of claim 9, further comprising:
a memory having the first conductivity type disposed in the substrate adjacent to the photoelectric conversion region and configured to store charge generated by the photoelectric conversion region.

11. The imaging device of claim 10, further comprising:
a fourth region between the second region and the light-incident side of the photoelectric conversion region and having the first conductivity type at a higher impurity concentration than the photoelectric conversion region; and
a fifth region disposed around a right side, a left side, and a light-incident side of the memory and having the first conductivity type at a higher impurity concentration than the memory.

12. The imaging device of claim 10, wherein the light shielding structure is disposed around three sides of the memory in the cross-sectional view.

* * * * *